(12) United States Patent
Lee

(10) Patent No.: US 8,306,486 B2  
(45) Date of Patent: Nov. 6, 2012

(54) METHODS AND APPARATUS FOR REDUCING THE AVERAGE-TO-MINIMUM POWER RATIO OF COMMUNICATIONS SIGNALS IN COMMUNICATIONS TRANSMITTERS

(75) Inventor: Wayne Lee, San Mateo, CA (US)

(73) Assignee: Panasonic Corporation, Osaka (JP)

(*) Notice: Subject to any disclaimer, the term of this patent is extended or adjusted under 35 U.S.C. 154(b) by 569 days.

(21) Appl. No.: 12/508,477

(22) Filed: Jul. 23, 2009

(65) Prior Publication Data

US 2011/0021165 A1    Jan. 27, 2011

(51) Int. Cl.  
*H04B 1/04* (2006.01)  
*H04K 1/02* (2006.01)

(52) U.S. Cl. ............... 455/114.3; 455/115.1; 455/126; 455/108; 455/110; 375/296; 375/297

(58) Field of Classification Search .......... 455/108, 455/110, 115.1, 114.3; 375/296, 298, 300, 375/302  
See application file for complete search history.

(56) References Cited

U.S. PATENT DOCUMENTS

| | | | | |
|---|---|---|---|---|
| 5,696,794 | A * | 12/1997 | O'Dea | 375/296 |
| 6,754,284 | B2 * | 6/2004 | Stogner et al. | 375/295 |
| 6,865,237 | B1 * | 3/2005 | Boariu et al. | 375/295 |
| 7,054,385 | B2 | 5/2006 | Booth et al. | |
| 7,158,494 | B2 * | 1/2007 | Sander et al. | 370/329 |
| 2005/0281360 | A1 * | 12/2005 | Booth et al. | 375/346 |
| 2007/0211829 | A1 * | 9/2007 | Liang et al. | 375/320 |
| 2009/0257526 | A1 * | 10/2009 | Wang et al. | 375/298 |
| 2010/0316164 | A1 * | 12/2010 | Liang et al. | 375/298 |

* cited by examiner

*Primary Examiner* — Duc M Nguyen

(57) ABSTRACT

Methods and apparatus for reducing the average-to-minimum power ratio (AMPR) of communications signals in communications transmitters. An AMPR-reducing method includes detecting a sample of a baseband signal having a magnitude less than a predetermined low-magnitude threshold. The magnitude and/or angle of the baseband signal is modified in the temporal vicinity of the detected low-magnitude sample, to form a modified baseband signal having a reduced AMPR. The baseband signal is modified by scaling an insertion pulse by a complex pulse insertion vector and combining the resulting scaled complex insertion pulse with the baseband signal in the temporal vicinity of the detected low-magnitude sample. The pulse insertion angle may be set to any angle within a pulse insertion vector range determined by a vector defining the detected low-magnitude sample and a vector that is orthogonal to the trajectory of the baseband signal.

29 Claims, 19 Drawing Sheets

200

METHODS AND APPARATUS FOR REDUCING THE AVERAGE-TO-MINIMUM POWER RATIO OF COMMUNICATIONS SIGNALS IN COMMUNICATIONS TRANSMITTERS

FIELD OF THE INVENTION

The present invention relates to communications systems and methods. More specifically, the present invention relates to methods and apparatus for reducing the average-to-minimum power ratio (AMPR) of communications signals.

BACKGROUND OF THE INVENTION

Radio frequency (RF) communications systems, such as cellular and wireless area networks, are ubiquitous in today's world. A key and essential component of every RF communications system is the RF transmitter. As illustrated in FIG. 1, an RF transmitter 100 generally comprises a baseband processor 102, a frequency upconverter 104, a power amplifier (PA) 106 and an antenna 108. The purpose of the baseband processor 102 is to generate a baseband signal s(t) containing a message to be transmitted and formatted in accordance with a predetermined modulation scheme. The purpose of the frequency upconverter 104 is to upconvert the baseband signal s(t) to RF, so that the message is capable of being propagated through space (i.e., transmitted over the air) to a remote receiver. The PA 106 is used to increase the power of the RF signal before it is radiated by the antenna 108, to compensate for attenuation of the RF signal as it is transmitted over the air to the remote receiver.

In modern RF transmitters, the message to be transmitted is first digitized in the form of a binary-source data stream. The baseband processor 102 then groups the data bits in the binary-source data stream into a sequence of N-bit words, where N is some positive integer, and maps the pattern of bits in each N-bit word to one of $M=2^N$ possible symbols. The M symbols are defined by the particular modulation scheme being employed, and affect how the amplitude and/or angle of the RF carrier signal is varied (i.e., modulated) to carry the message in the original binary-source data stream to the remote receiver. By mapping each N-bit word to one of M possible symbols, $N=\log_2 M$ bits can be transmitted in each symbol.

Conceptually, the symbols generated by the baseband processor 102 can be visualized as a sequence of weighted impulses. These impulses have essentially infinite bandwidth. To limit their bandwidth, the baseband processor 102 is further configured to shape each symbol by a band-limiting pulse p(t).

Mathematically, the baseband signal s(t) can be expressed as a sequence of pulse-shaped symbols:

$$s(t) = \sum_n a_n p(t - nT_s),$$

where n is a symbol index, $a_n$ is the $n^{th}$ symbol in the sequence of symbols, p(t) is the pulse at time t, and $T_s$ is the symbol period. $a_n$ is either a real or complex number having one of M possible states. For example, in the quadrature phase-shift keying (QPSK) modulation scheme, M=4, and $a_n$ is given by $a_n = e^{j\pi(2d_n+1)/2}$, where $d_n$ is an integer selected from the set {0, 1, 2, 3}.

Because the baseband signal s(t) is in general a complex signal, it is usually expressed in terms of its in-phase (I) and quadrature (Q) components, i.e., as s(t)=I(t)+jQ(t) and the baseband processor 102 is configured to generate separate pulse-shaped I and Q baseband signals for each of the I and Q channels of the RF transmitter.

FIG. 2 is a drawing showing how the baseband signal s(t) is processed in terms of its I and Q components in a practical RF transmitter 200. The RF transmitter 200 comprises a baseband processor 202, I-channel and Q-channel digital to analog converters 204 and 206, a transmit local oscillator (Tx-LO) 208, a quadrature modulator 210; a PA 212; and an antenna 214. Because of its use of the quadrature modulator 210, the RF transmitter 200 is referred to in the description that follows as the "quadrature-modulator-based" transmitter 200.

The quadrature modulator 210 includes an I-channel mixer 216, a Q-channel mixer 218, a ninety-degree phase shifter 220, and a subtractor 222. The I-channel and Q-channel digital to analog converters 204 and 206 convert the pulse-shaped I and Q baseband signals from the baseband processor 202 into analog I and Q baseband signals. The quadrature modulator 210 then upconverts the analog I and Q baseband signals to RF. Specifically, the I-channel mixer 216 mixes the analog I baseband signal with an RF carrier signal provided by the Tx-LO 208, while the Q-channel mixer 218 mixes the analog Q baseband signal with a ninety-degree phase-shifted version of the RF carrier signal produced at the output of the ninety-degree phase shifter 220. The upconverted I- and Q-channel RF carrier signals are then combined by the subtractor 222, to produce the desired modulated RF carrier signal. Finally, the modulated RF carrier signal is amplified by the PA 212 and radiated over the air to a remote receiver by the antenna 214.

One advantage of the quadrature-modulator-based RF transmitter 200 is that both amplitude and angle (i.e., frequency or phase) modulation can be introduced into the RF carrier signal by simply controlling the amplitudes of the I and Q baseband signals. However, a significant drawback is that it is not very energy efficient, particularly when the modulation scheme being employed is a non-constant envelope modulation scheme.

In an effort to use the RF spectrum as efficiently as possible, modern communications systems commonly employ non-constant envelope modulation schemes in which both the amplitude and angle of the baseband signal s(t) are varied. As illustrated in FIG. 3, use of a non-constant envelope modulation scheme results in a modulated RF carrier signal at the RF input RFin of the PA 212 having a non-constant (i.e., time varying) envelope. To prevent the PA 212 from clipping the signal peaks of these signals, the input power of the modulated RF carrier signal must be backed off to ensure that the PA 212 always operates in its linear region of operation. In other words, the PA 212 must be operated as a "linear" PA when a quadrature modulator is used.

While employing power back-off does help to ensure PA linearity, it also results in a significant reduction in energy efficiency. The energy efficiency of an RF transmitter is determined in large part by the efficiency of the RF transmitter's PA. The energy efficiency of the PA is defined as the ratio of the PA RF output power to the direct current (DC) power supplied to the PA 212 from the RF transmitter's constant voltage supply Vs. Energy efficiency is therefore high when the PA is operating at high RF output powers, but low when the PA is operating at low RF output powers. In most applications, the PA operates at high or peak RF output powers only for very short periods of time. For all other times (i.e., most of the time), the RF output power is backed off, resulting in a substantial reduction in energy efficiency.

Low energy efficiency is undesirable in most applications. It is particularly undesirable in battery-powered RF transmitters, such as those used in cellular handsets, since it results in shortened battery life. Fortunately, an alternative type of communications transmitter known as a polar transmitter is available which avoids the linearity versus efficiency tradeoff of the quadrature-modulator-based transmitter 200. In a polar transmitter the amplitude information (i.e., the signal envelope) is temporarily removed from the non-constant envelope signal. The remaining signal, which has a constant envelope, is upconverted to RF and applied to the RF input port of the PA while the previously removed signal envelope is used to dynamically control the power supplied to the PA. Because the signal applied to the RF input of the PA has a constant envelope, a more efficient nonlinear PA can be used without the risk of signal peak clipping.

FIG. 4 is a drawing showing the basic elements of a polar transmitter 400. The polar transmitter 400 comprises a baseband processor 402; a Coordinate Rotation Digital Computer (CORDIC) converter (i.e., rectangular-to-polar converter) 404; an amplitude path including an amplitude path DAC 406 and amplitude modulator 408; an angle path including an angle path DAC 410 and angle modulator 412; a PA 414; and an antenna 416. The purpose of the CORDIC converter 404 is to convert the digital rectangular-coordinate pulse-shaped I and Q baseband signals from the baseband processor 402 to digital polar-coordinate amplitude and angle component signals ρ and θ. The amplitude and angle path DACs 406 and 410 convert the digital amplitude and angle component signals ρ and θ into analog amplitude and angle modulation signals. In the amplitude path, the amplitude modulator 408 then modulates a direct current power supply voltage Vsupply (e.g., as provided by a battery) by the amplitude information in the analog amplitude modulation signal. The resulting amplitude-modulated power supply signal Vs(t) is coupled to the power supply port of the PA 414. Meanwhile, in the angle path the angle modulator 412 operates to modulate an RF carrier signal by the angle information in the analog angle modulation signal, to produce an angle-modulated RF carrier signal which is coupled to the RF input port RFin of the PA 414.

The angle-modulated RF carrier signal at the RF input port RFin of the PA 414 has a constant envelope (see FIG. 5). As alluded to above, this permits the PA 414 to be configured to operate in its nonlinear region of operation (i.e., as a "nonlinear" PA) without the risk of signal peak clipping. Typically the PA 414 is implemented as a highly-efficient switch-mode PA (e.g., as a Class D, E or F switch-mode PA) operating between compressed and cut-off states. When configured in this manner, the envelope information in the amplitude-modulated power supply signal Vs(t) is restored at the RF output RFout of the PA 414 as the PA 414 amplifies the angle-modulated RF carrier signal. By operating the PA 414 as a switch and dynamically controlling the power supplied to it, the polar transmitter 400 is able to achieve significantly higher energy efficiencies than the quadrature-modulator-based RF transmitter 200.

Although the polar transmitter 400 is more energy efficient than the quadrature-modulator-based transmitter 200, the amplitude and angle component signals ρ and θ typically have much higher signal bandwidths than the rectangular-coordinate I and Q baseband signals from which they derive. This so-called "bandwidth expansion" phenomenon occurs during the rectangular-to-polar conversion process performed by the CORDIC converter 404. The high signal bandwidths are manifested as high-frequency events in the amplitude and angle component signals ρ and θ and are highly undesirable. Not only do the high-frequency events tend to degrade the modulation accuracy of the polar transmitter 400, they also cause the transmission spectrum to extend beyond its intended band-limited channel, resulting in adjacent channel interference and an increase in receive band noise. These effects can be very difficult to deal with, especially when modulation accuracy and noise limit standards must be adhered to.

The extent to which high-frequency events appear in the amplitude and angle component signals ρ and θ is very much dependent on the modulation scheme being employed. Modulation schemes that produce signals having a high average-to-minimum power ratio (AMPR) generally have a very large angle component bandwidth. In fact, for modulation schemes that produce signal magnitudes that pass through zero, as illustrated in the signal trajectory diagram in FIG. 6, the signal phase changes very abruptly, by as much as 180 degrees, resulting in an angle component signal θ having essentially infinite bandwidth. Signals of such high bandwidth cannot be accurately processed and transmitted by the polar transmitter 400, or by any type of transmitter for that matter.

Various techniques have been proposed to reduce high-frequency events in polar domain signals. One approach, known as "hole blowing," involves identifying symbols (or samples of symbols) in the baseband signal s(t) during which the magnitude of the signal falls below a predetermined low-magnitude threshold, and then raising the magnitude of the baseband signal s(t) in the temporal vicinity of the identified symbols or samples so that the AMPR of the signal is reduced. The term "hole blowing" is used since the effect of applying the technique is to produce a "hole" in the signal trajectory diagram of the baseband signal s(t). As illustrated in FIG. 7, the "hole" forces the trajectory of the modified baseband signal ŝ(t) to not pass too close to the origin, resulting in a desired reduction in the bandwidth of the signal.

The conventional hole blowing technique is described in detail in U.S. Pat. No. 7,054,385. As explained there, the baseband signal s(t) is modified by adding correction pulses to it, to form the modified baseband signal:

$$\hat{s}(t) = \sum_n a_n p(t - nT_s) + \sum_m b_m r(t - t_m),$$

where r(t) is the correction pulse, m is the perturbation index, $t_m$ represents the times when the baseband signal s(t) is perturbed (i.e., the times when the correction pulse r(t) is inserted), and $b_m$ is a perturbation sequence representing the amplitude scaling and/or angle shifting applied to the correction pulse r(t).

As shown in FIG. 8, in generating the modified baseband signal ŝ(t) the baseband signal s(t) from the baseband processor 102 is fed forward to an analyzer 802. The analyzer 802 then determines the perturbation times $t_m$ by detecting low-magnitude events in the baseband signal s(t) that are below the predetermined low-magnitude threshold. In response to detected low-magnitude events, the analyzer 802 generates the perturbation sequence $b_m$. A pulse-shaping filter 804 generates the correction pulse r(t), scales the pulse by the perturbation sequence $b_m$, and finally adds the scaled correction pulses to the original baseband signal s(t) to produce the desired AMPR-reduced modified baseband signal ŝ(t).

While the conventional hole blowing technique can be helpful in reducing AMPR in some applications, it can be ineffective, deficient or even detrimental in others. The conventional hole blowing technique estimates the signal trajectory of the baseband signal s(t) and identifies low-magnitude events based on only two data points of the baseband signal s(t) at a time. Using only two data points can lead to errors in detecting low-magnitude events and can underestimate the level of AMPR reduction that needs to be performed in order to satisfy a particular design requirement or standards specification. The conventional hole blowing technique also requires that the angle of each correction pulse insertion vector be orthogonal to the signal trajectory of the baseband signal s(t). This rigid requirement on the required angle of the pulse insertion vector can increase the complexity of AMPR-reducing circuitry, and lacks any flexibility that would allow the angle of the pulse insertion vector to be adjusted to satisfy a desired balance or combination of in-band and out-of-band noise performance characteristics. Finally, the conventional hole blowing technique is incapable of taking into account prior modifications to the baseband signal s(t). In some circumstances, this can diminish the overall effectiveness of AMPR reduction. In particular, for those modulation schemes having multiple constellation points near the origin in the complex signal plane, the inability to take into account prior modifications to the baseband signal s(t) can result in the generation of pulse insertion vectors that effectively cancel one another out. Such a result defeats the purpose of hole blowing since the signal trajectory of the baseband s(t) can still pass near or through the origin even after the AMPR reduction process has been applied.

It would be desirable, therefore, to have AMPR-reducing methods and apparatus for communications transmitters that are effective at reducing the AMPR of communications signals but which are not plagued by the drawbacks and limitations associated with conventional hole blowing techniques.

SUMMARY OF THE INVENTION

Methods and apparatus for reducing the average-to-minimum power ratio (AMPR) of communications signals in communications transmitters are disclosed. An exemplary method includes first generating samples of a baseband signal that is formatted in accordance with a non-constant envelope modulation scheme. Next, samples in a first set of samples are analyzed to detect whether any of the samples has a magnitude less than a predetermined low-magnitude threshold. If a low-magnitude event is detected among the samples in the set, the magnitude and/or angle of the baseband signal is modified in the temporal vicinity of the detected low-magnitude sample, thereby forming a modified baseband signal having a reduced AMPR. The baseband signal is modified by scaling an insertion pulse by a complex pulse insertion vector and combining the resulting scaled complex insertion pulse with the baseband signal in the temporal vicinity of the detected low-magnitude sample. Unlike conventional hole blowing techniques, the pulse insertion vector angle is not restricted to being orthogonal to the trajectory of the baseband signal in the temporal vicinity of the detected low-magnitude event. Rather, it may be adjusted and set to any angle within a range of angles determined by the sample vector defining the detected low-magnitude sample and a vector that is orthogonal to the trajectory of the baseband signal in the temporal vicinity of the low-magnitude sample.

The AMPR-reducing methods and apparatus of the present invention also identify low-magnitude samples based on sets of samples that include at least three samples, thereby improving the accuracy and reliability of detecting low-magnitude events in the baseband signal compared to conventional hole blowing techniques, which identify low-magnitude events based on only two data points of the baseband signal at a time.

The AMPR-reducing methods and apparatus of the present invention may be employed in any type of transmitter in which a high AMPR is of concern. Examples of their use in a generalized transmitter, quadrature-modulator-based transmitter, and polar transmitter are illustrated and described.

Further features and advantages of the present invention, including descriptions of the structure and operation of the above-summarized and other exemplary embodiments of the invention, will now be described in detail with respect to accompanying drawings, in which like reference numbers are used to indicate identical or functionally similar elements.

DETAILED DESCRIPTION

Figure 1:
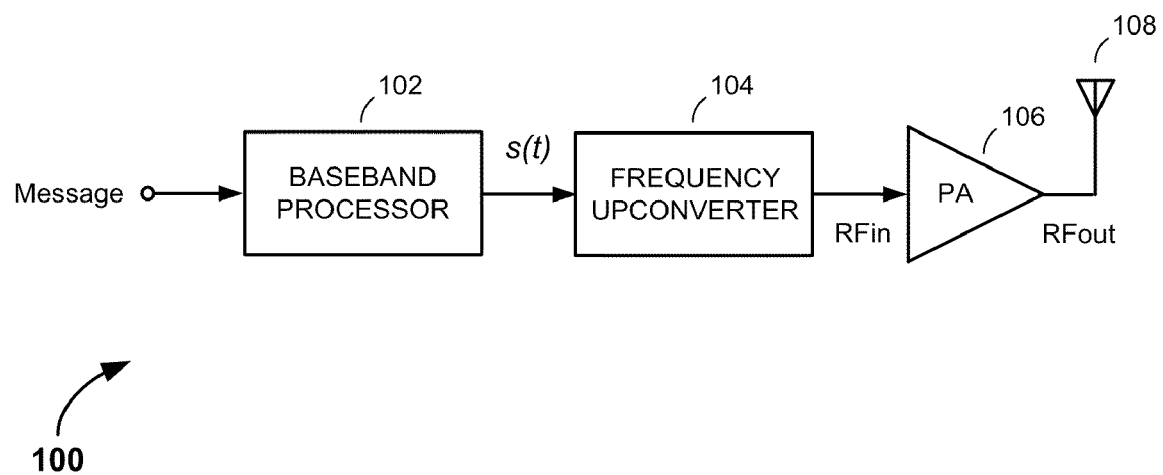
FIG. 1 is a simplified drawing of a radio frequency (RF) transmitter.
Figure 2:
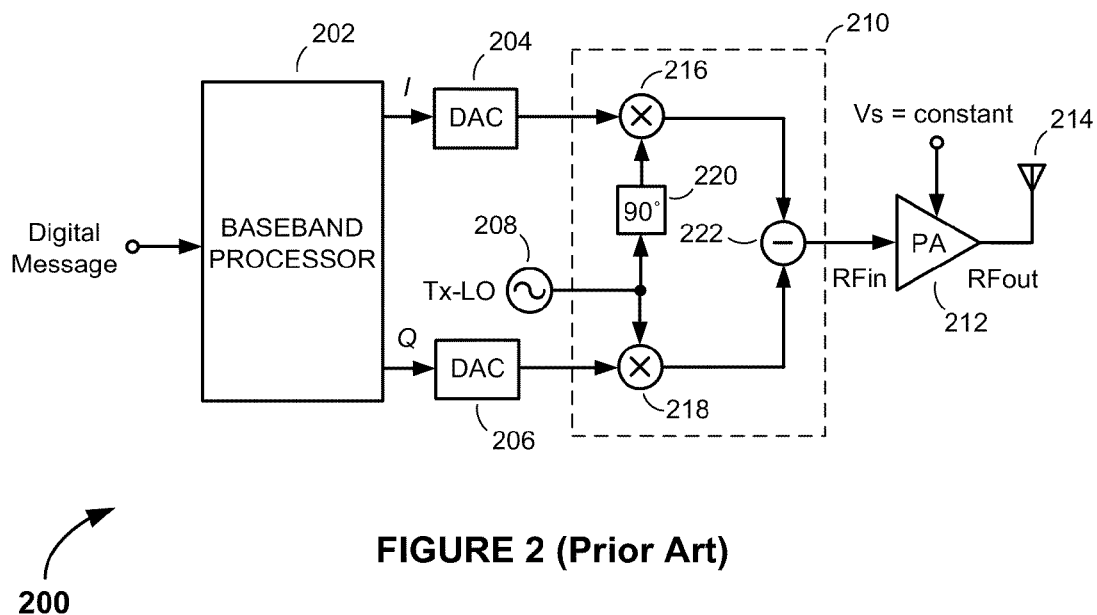
FIG. 2 is drawing of a conventional quadrature-modulator-based transmitter.
Figure 3:
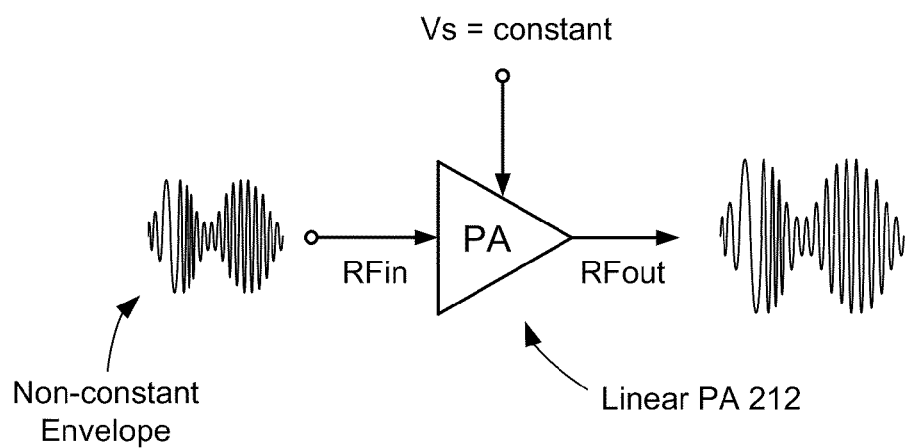
FIG. 3 is a drawing illustrating how the modulated RF carrier signal presented to the RF input port of the power amplifier (PA) of a quadrature-modulator-based transmitter has a non-constant (i.e., time varying) envelope when the quadrature-modulator-based transmitter is configured to operate in accordance with a non-constant envelope modulation scheme.
Figure 4:
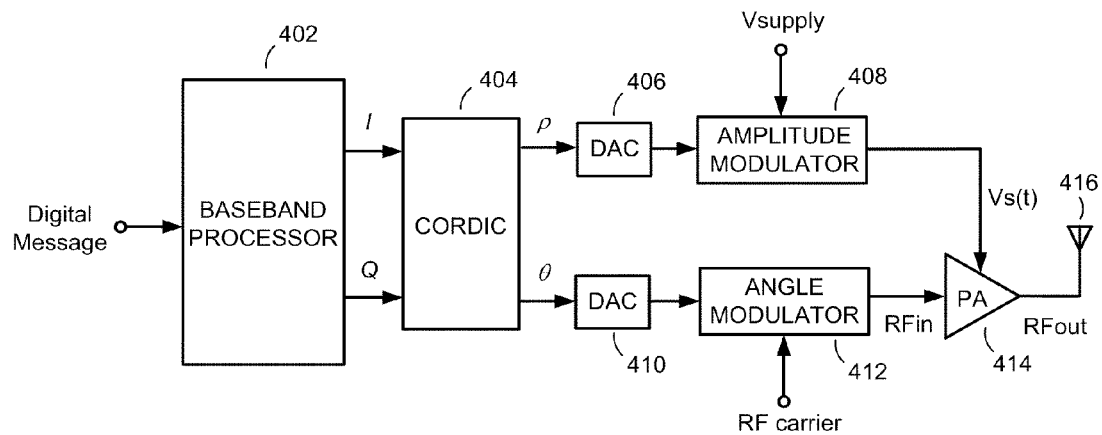
FIG. 4 is a drawing of a conventional polar transmitter.
Figure 5:
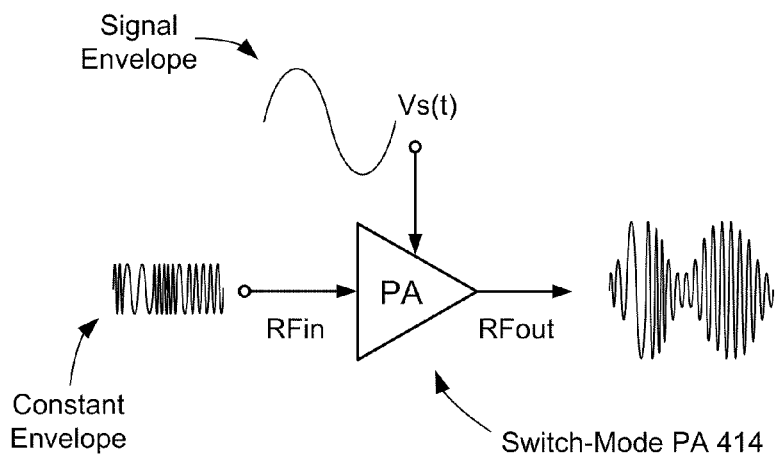
FIG. 5 is a drawing illustrating how the modulated RF carrier signal presented to the RF input port of the PA of a polar transmitter has a constant envelope even when the polar transmitter is configured to operate in accordance with a non-constant envelope modulation scheme.
Figure 6:
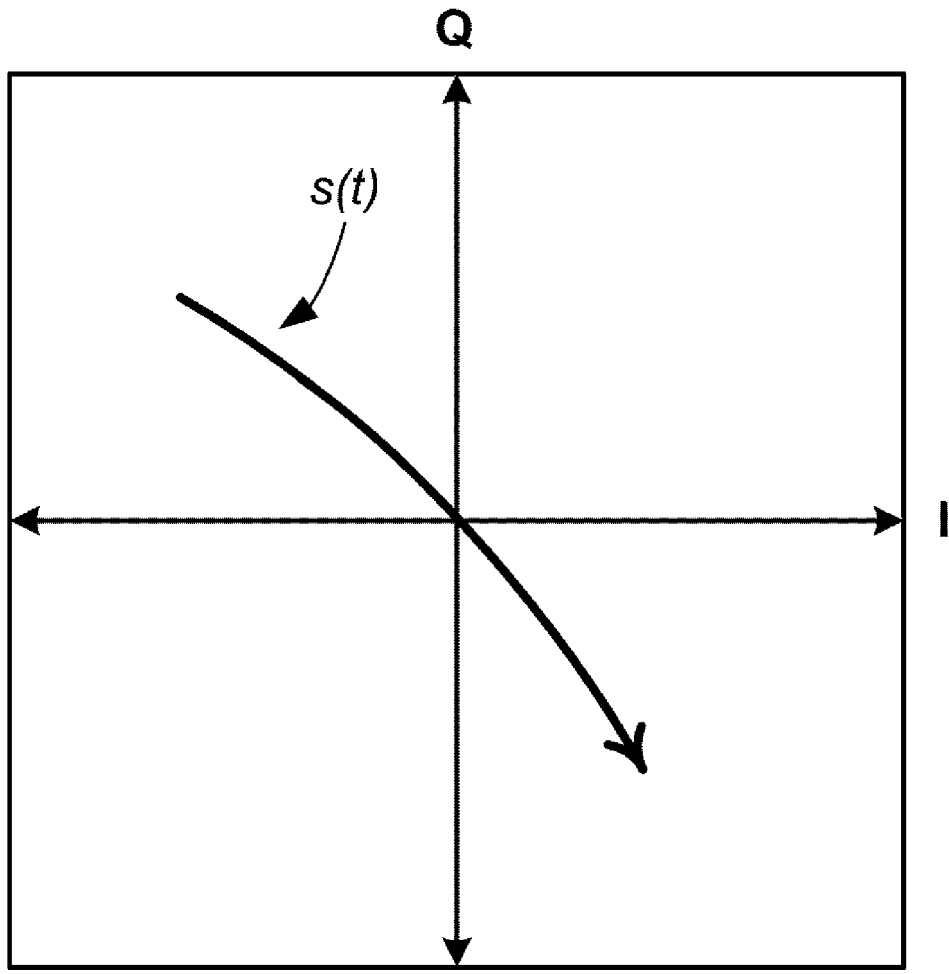
FIG. 6 is a signal trajectory diagram of a baseband signal s(t) that passes through the origin of the complex signal plane.
Figure 7:
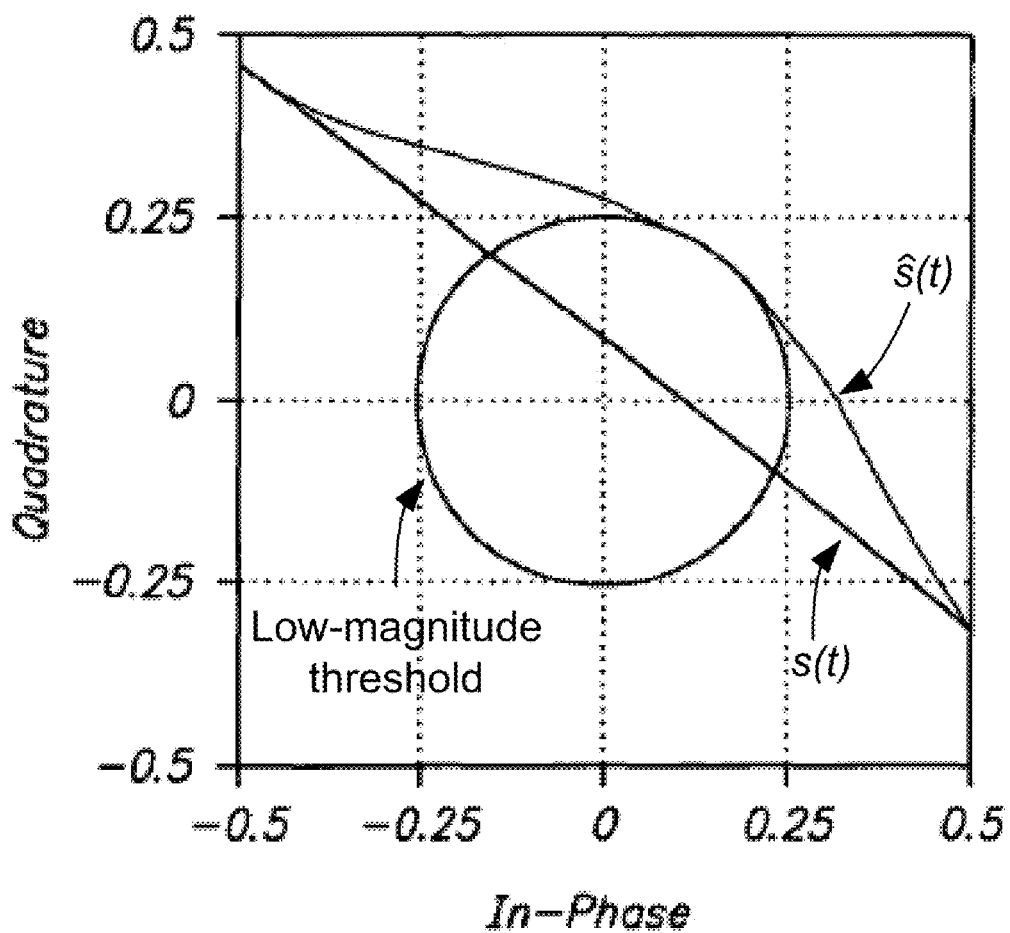
FIG. 7 is a signal trajectory diagram of a baseband signal s(t) and a modified baseband signal ŝ(t) that has been subjected to a conventional hole blowing process.
Figure 8:
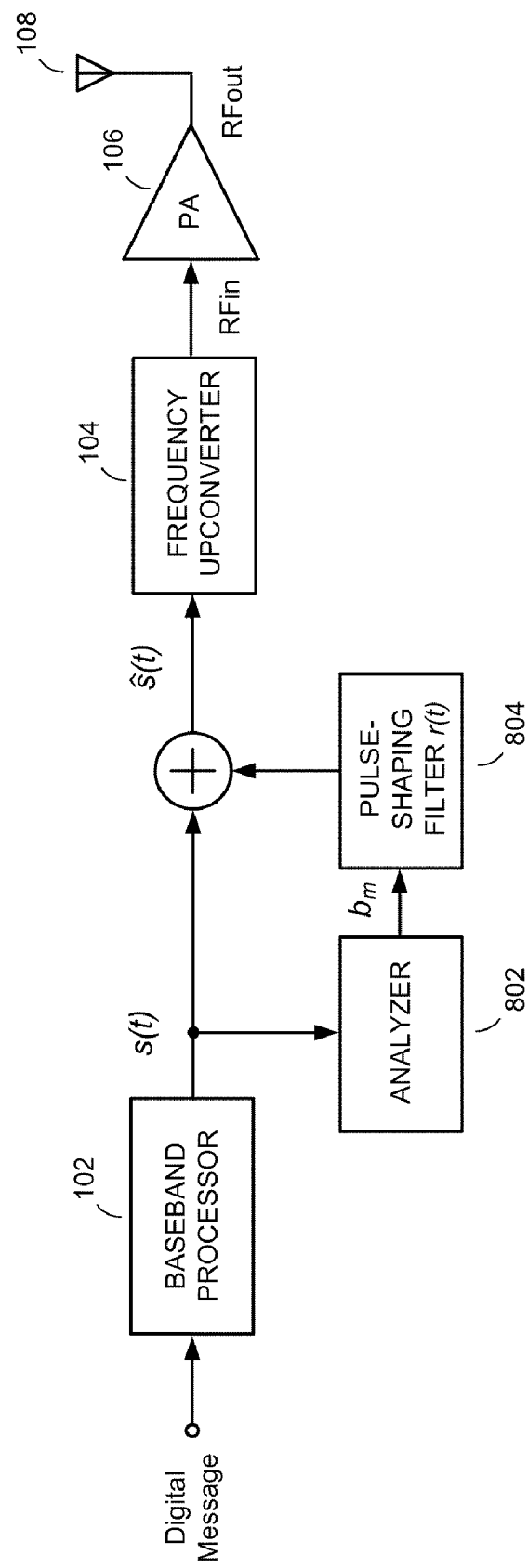
FIG. 8 is a drawing of an RF transmitter that includes a conventional hole blowing apparatus.
Figure 9:
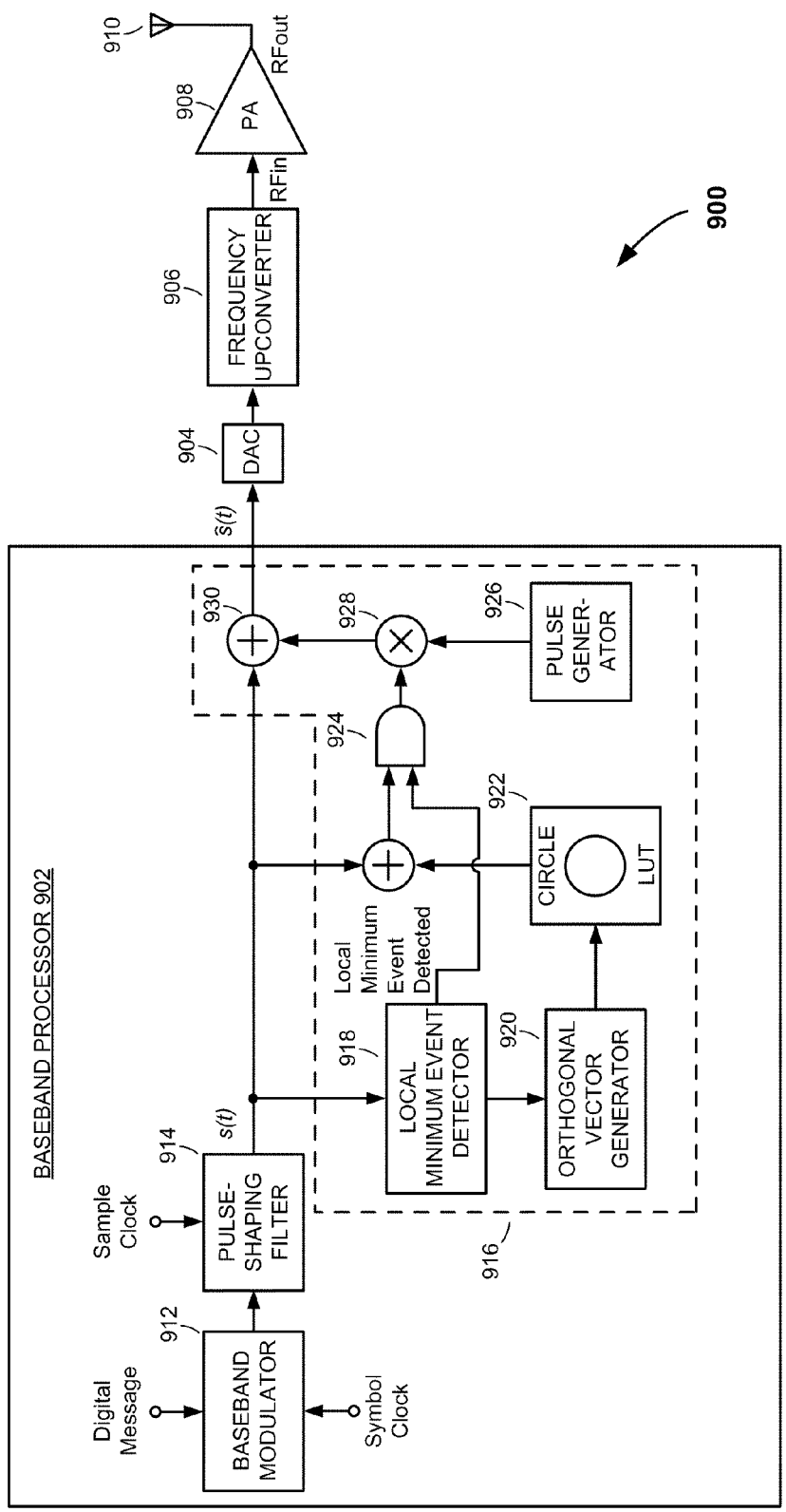
FIG. 9 is a drawing of an RF transmitter that includes circuitry for reducing the average-to-minimum power ratio (AMPR) of communications signals, according to an embodiment of the present invention.

Referring to FIG. 9, there is shown a radio frequency (RF) transmitter 900 including circuitry for reducing the average-to-minimum power ratio (AMPR) of communications signals, according to an embodiment of the present invention. The RF transmitter comprises a baseband processor 902, a digital-to-analog converter (DAC) 904, a frequency upconverter 906, a power amplifier (PA) 908, and an antenna 910. The baseband processor 902 includes a baseband modulator 912, a pulse-shaping filter 914, and an AMPR reduction circuit 916. In this and other exemplary embodiments described below, the baseband processor 902, including the baseband modulator 912, pulse-shaping filter 914, and AMPR reduction circuit 916, are formed as a digital signal processor (DSP) in one or more integrated circuits. The DSP may implemented as hardware or a combination of hardware and software, such as a microprocessor, microcontroller, field-programmable gate array, or other programmable or nonprogrammable integrated circuit, as will be appreciated by those of ordinary skill in the art.

The baseband modulator 912 is configured to generate a sequence of symbols at a symbol clock rate from data bits in a digital message to be transmitted. The sequence of symbols is then filtered by the pulse-shaping filter 914 and sampled by a sample clock (or an oversampling clock if oversampling is used) to provide a sequence of samples representing an unmodified baseband signal $s(t)=I(t)+jQ(t)$, where I(t) and Q(t) are the real (i.e., in-phase) and imaginary (i.e., quadrature phase) components, respectively, of the unmodified baseband signal s(t).

The modulation scheme employed by the baseband modulator 912 is a non-constant envelope modulation scheme determined by design requirements and/or set by a standard. In one embodiment, the RF transmitter 900 is configured to operate in a third generation (3G) mobile telecommunications system and employs a non-constant envelope modulation scheme standardized by the 3G Partnership Project (3GPP), such as the Hybrid Phase Shift Keying (HPSK) non-constant envelope modulation scheme used in 3G Universal Mobile Telecommunications System (UMTS) networks or one of the non-constant envelope modulation schemes used by the 3G High-Speed Downlink Packet Access (HSDPA) or High-Speed Uplink Packet Access (HSUPA) communication protocols. In another embodiment, the RF transmitter 900 is configured for operation in a wireless local area network (LAN) and employs an orthogonal frequency division multiplexing (OFDM) non-constant envelope scheme, such as specified by the Institute of Electrical and Electronics Engineers (IEEE) 802.11 body of standards. While the RF transmitter 900 is suitable for use in UMTS and wireless LAN applications, those of ordinary skill in the art will appreciate and understand that it is not limited to use in any particular system or application or to any particular modulation scheme or standard. In fact, it may be adapted for use in any communications system in which a non-constant envelope modulation is used and in which a high AMPR is of concern. Further, whereas the exemplary embodiments are described in the context of RF applications, those of ordinary skill in the art will readily appreciate and understand that the methods and apparatus of the present invention are not limited to wireless or RF applications, and may be adapted for use in wired transmitters, such as those configured to transmit over a cable or fiber optic link.

Figure 10:
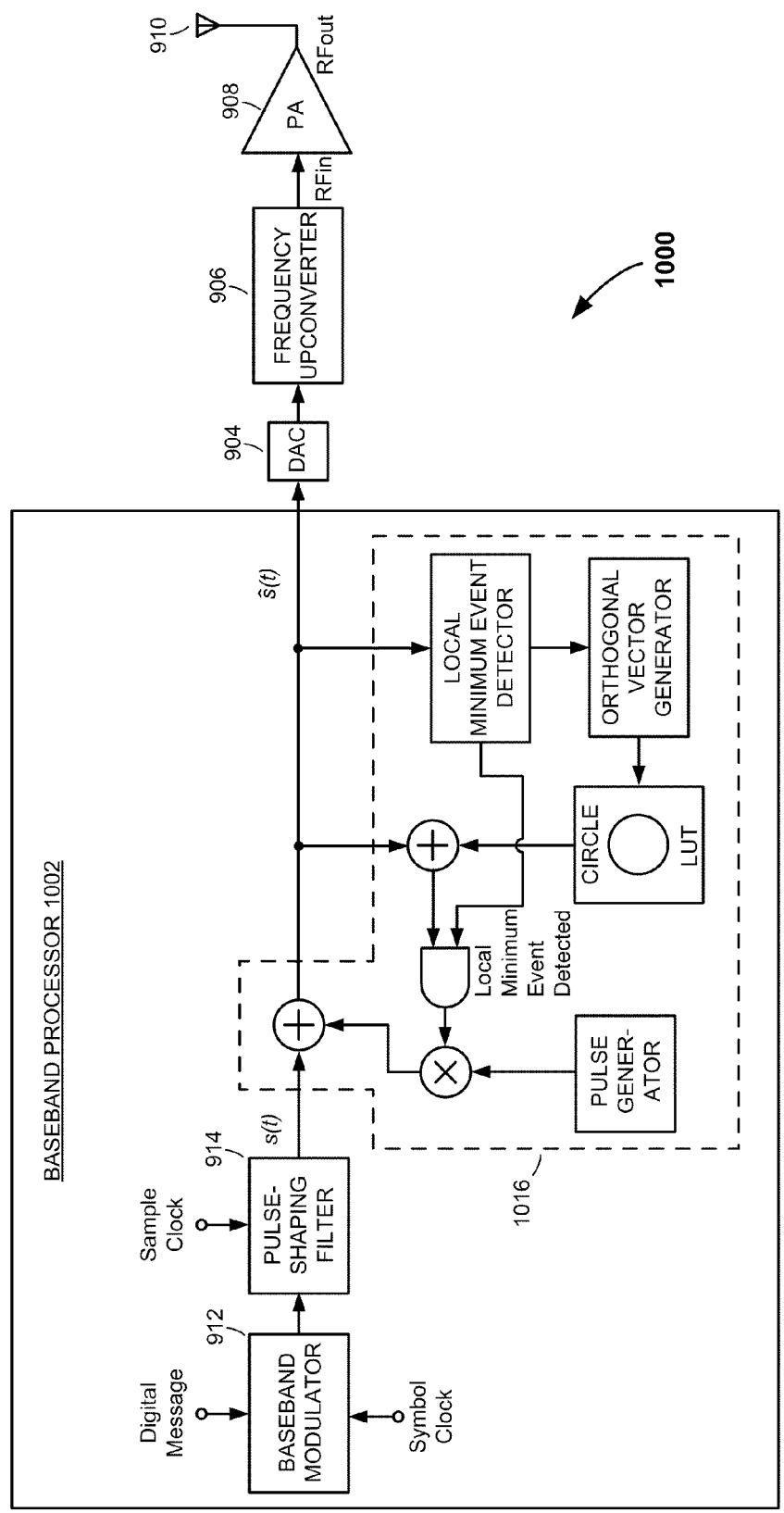
FIG. 10 is a drawing of an RF transmitter that includes circuitry for reducing the AMPR of communications signals, according to an embodiment of the present invention.

In the exemplary embodiment shown in FIG. 9, the AMPR reduction circuit 916 is coupled in a feed-forward arrangement between the pulse-shaping filter 914 and the output of the baseband processor 902. In another embodiment, shown in FIG. 10, a similar AMPR reduction circuit 1016 is coupled between the output of a baseband processor 1002 and pulse-shaping filter 914 in a feedback arrangement. Use of the feedback arrangement in FIG. 10 is advantageous in that it allows AMPR reduction to be performed on samples of the baseband signal s(t) that may have been previously modified by the AMPR reduction circuit 1016, thereby providing more enhanced and accurate control of the signal trajectory, and avoiding the problem of successive modifications of the baseband signal s(t) from possibly canceling one another out.

The AMPR reduction circuit 916 of the baseband processor 902 in FIG. 9 comprises a local minimum event detector 918, an orthogonal vector generator 920, a look-up table (LUT) 922 (labeled as "circle LUT" in the drawing), an AND logic gate 924 (or other logic equivalent), a pulse generator 926, a multiplier 928, and a combiner 930 in the main signal path of the RF transmitter 900. The AMPR reduction circuit 1016 of the RF transmitter 1000 in FIG. 10 is similar, except that it is configured in a feedback arrangement, as explained above.

The local minimum event detector 918 operates to detect samples in successive three-sample sets of samples of the baseband signal s(t) having magnitudes below a predetermined low-magnitude threshold, and upon detecting such low-magnitude samples, signify the detection of a local minimum event to the AND logic gate 924. The samples that are analyzed comprise previously unmodified (in the case of the feed-forward configuration in FIG. 9) or possibly previously modified samples (in the case of the feedback configuration in FIG. 10).

Figure 11:
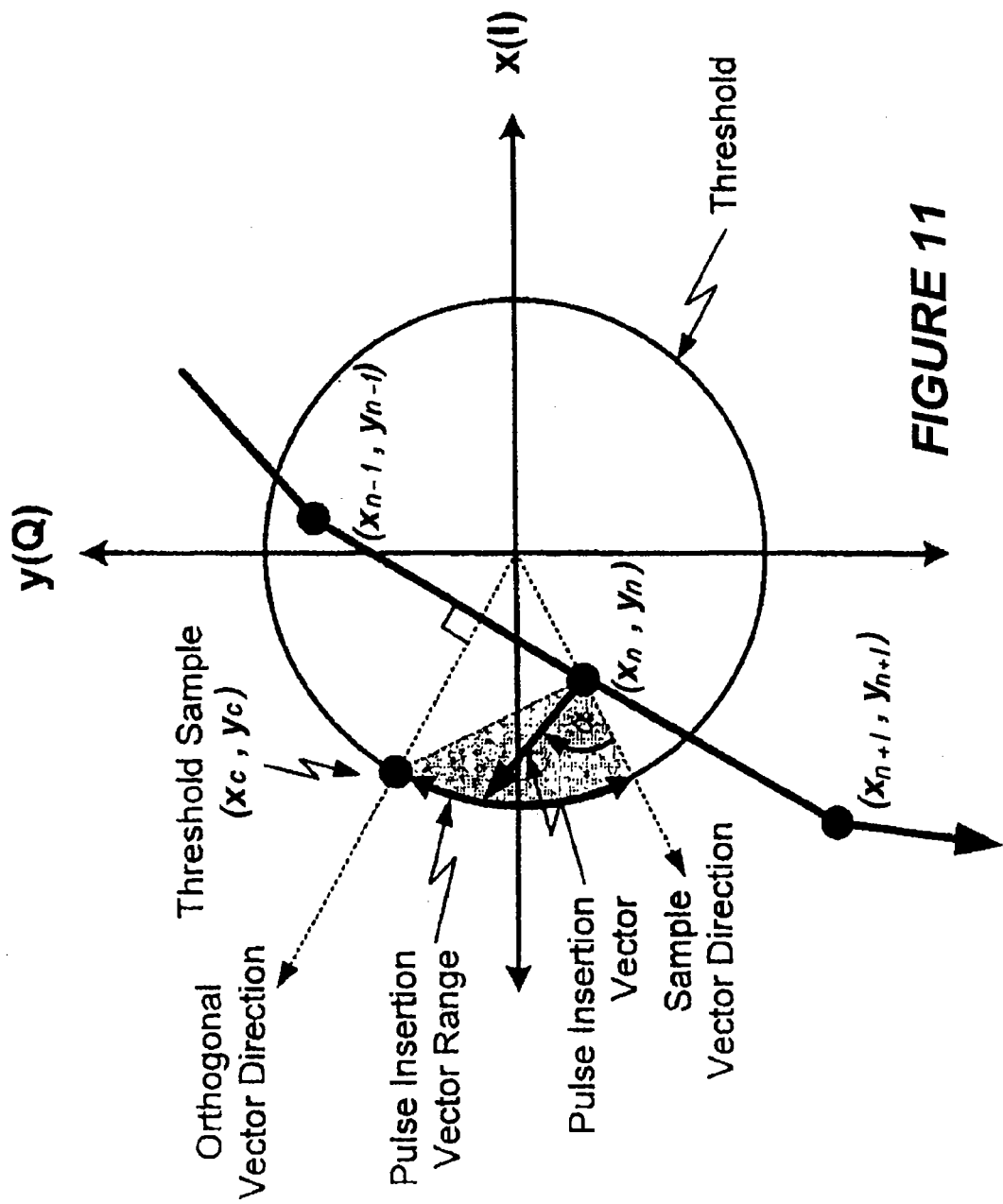
FIG. 11 is a vector diagram highlighting attributes of, and relationships among, various vectors used in the AMPR-reducing methods performed by the AMPR reduction circuits of the RF transmitters in FIGS. 9 and 10.

For each three-sample set analyzed by the local minimum event detector 918, the orthogonal vector generator 920 calculates an orthogonal vector that originates from the origin in the complex signal plane (see FIG. 11) and is orthogonal to a trajectory vector approximating the trajectory of the baseband signal s(t). Using the vector coordinates of the orthogonal vector as a reference, the circle LUT 922 provides a threshold sample $(x_c, y_c)$ that intersects with the low-magnitude threshold circle along the direction of the orthogonal vector.

Based on the coordinates of the threshold sample $(x_c, y_c)$ and the coordinates of the lowest-magnitude sample among the samples in each three-sample set, a pulse insertion vector is calculated. For those three-sample sets in which the local minimum event detector 918 had detected a local minimum event, the AND logic gate 924 passes the pulse insertion vector to the multiplier 928, which scales an insertion pulse provided by the pulse generator 926 according to the magnitude and phase of the pulse insertion vector. The AMPR reduction circuit 916 (or 1016) is configured to generate the pulse insertion vector based on the difference between a vector defining the threshold sample $(x_c, y_c)$ and the sample vector defining the lowest-magnitude sample $(x_n, y_n)$ (see FIG. 11). In an alternative embodiment, the AMPR reduction circuit 916 (or 1016) is configured so that it may set the angle of the pulse insertion vector to have any angle $\alpha$ between the direction of the sample vector and the direction of a vector between the lowest-magnitude sample $(x_n, y_n)$ and the threshold sample $(x_c, y_c)$, i.e., any angle within a pulse insertion vector range (shaded area in FIG. 11).

Finally, after the insertion pulse has been scaled by the pulse insertion vector, the scaled insertion pulse is combined with the baseband signal s(t) by the combiner 930 in the main signal path of the RF transmitter 900 (or 1000) to provide the desired AMPR-reduced baseband signals $\hat{s}(t)=\hat{I}(t)+j\hat{Q}(t)$, where $\hat{I}(t)$ is the real (i.e., in-phase) component of the AMPR-reduced signal and $\hat{Q}(t)$ is the imaginary (i.e., quadrature phase) component of the AMPR-reduced signal.

Figure 12:
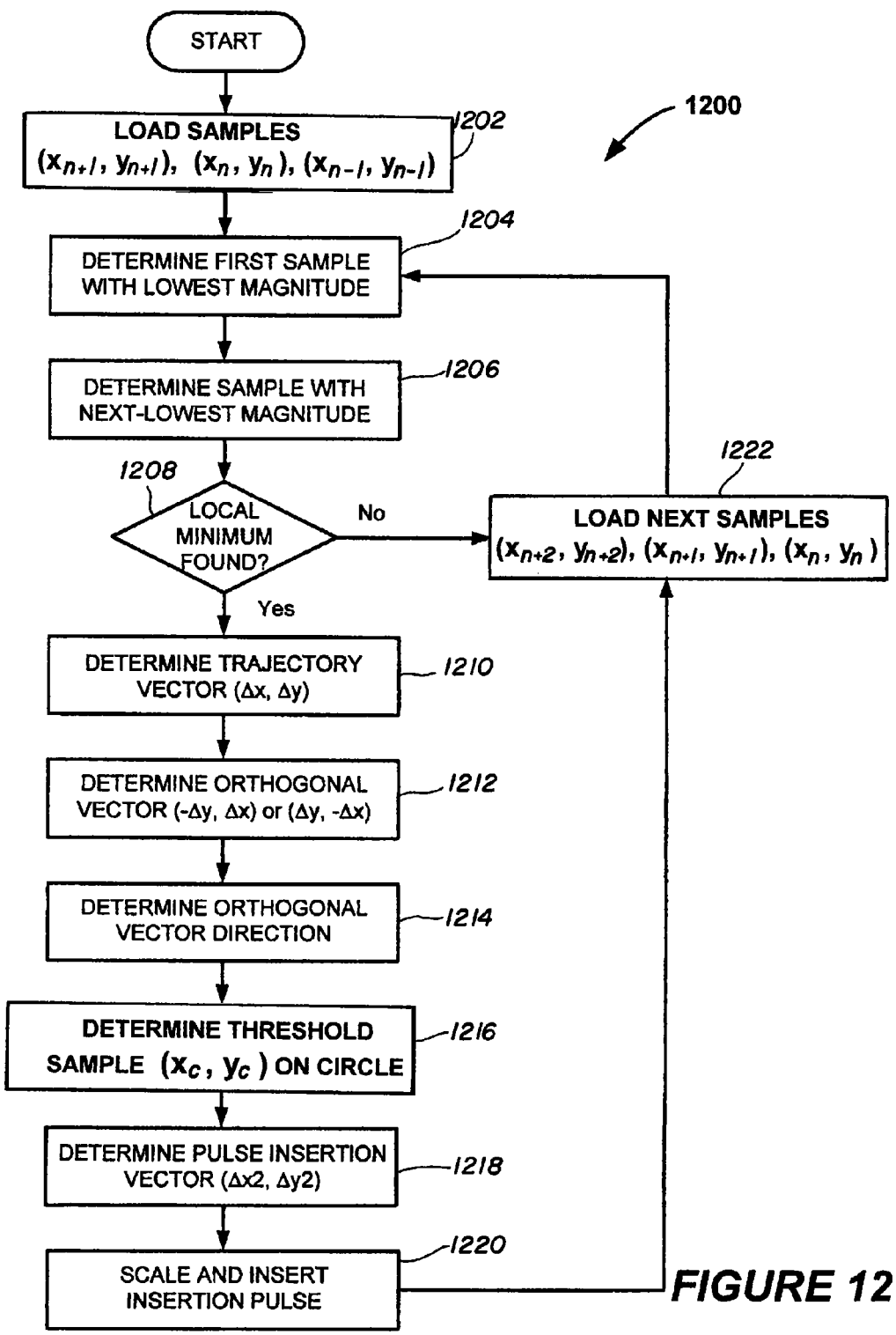
FIG. 12 is a flowchart illustrating the AMPR reduction methods performed by the AMPR reduction circuits of the RF transmitters in FIGS. 9 and 10.
Figure 13:
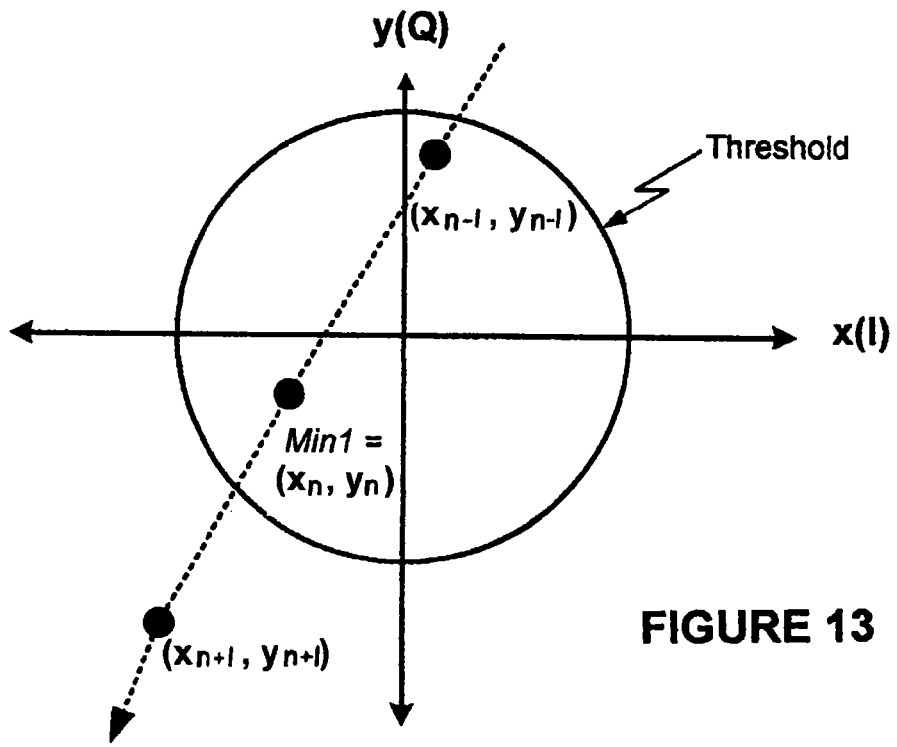
FIG. 13 is a vector diagram illustrating how the AMPR reduction method in FIG. 12 determines which sample among a three-sample set $(x_{n+1}, y_{n+1})$, $(x_n, y_n)$, $(x_{n-1}, y_{n-1})$ has the lowest magnitude.
Figure 14:
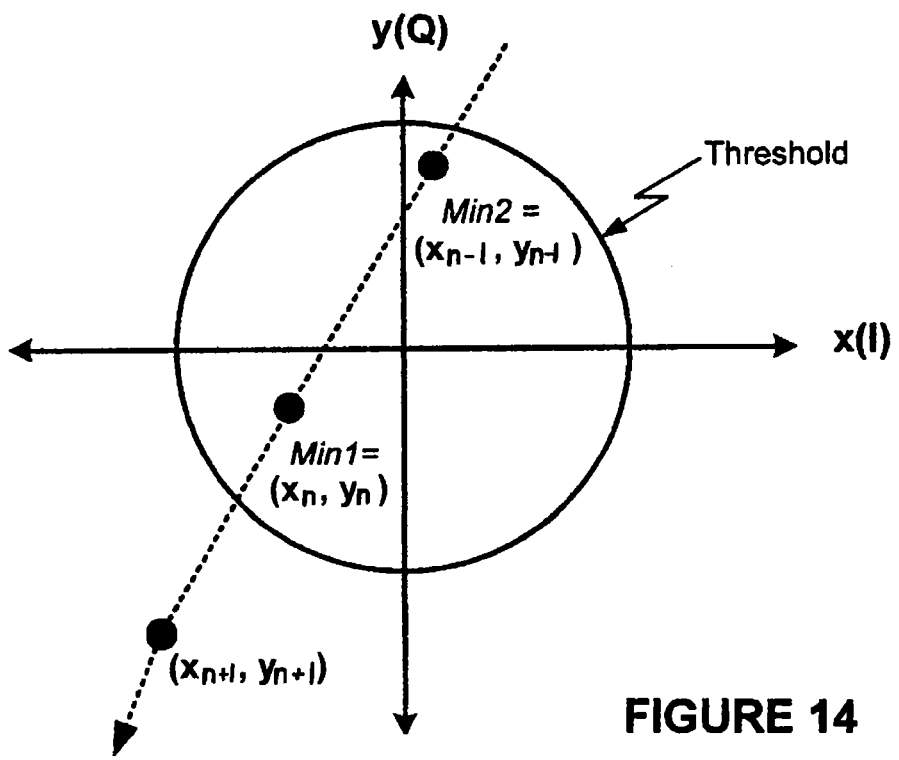
FIG. 14 is a vector diagram illustrating how the AMPR reduction method in FIG. 12 determines which sample among a three-sample set $(x_{n+1}, y_{n+1})$, $(x_n, y_n)$, $(x_{n-1}, y_{n-1})$, has the next-lowest magnitude.
Figure 15:
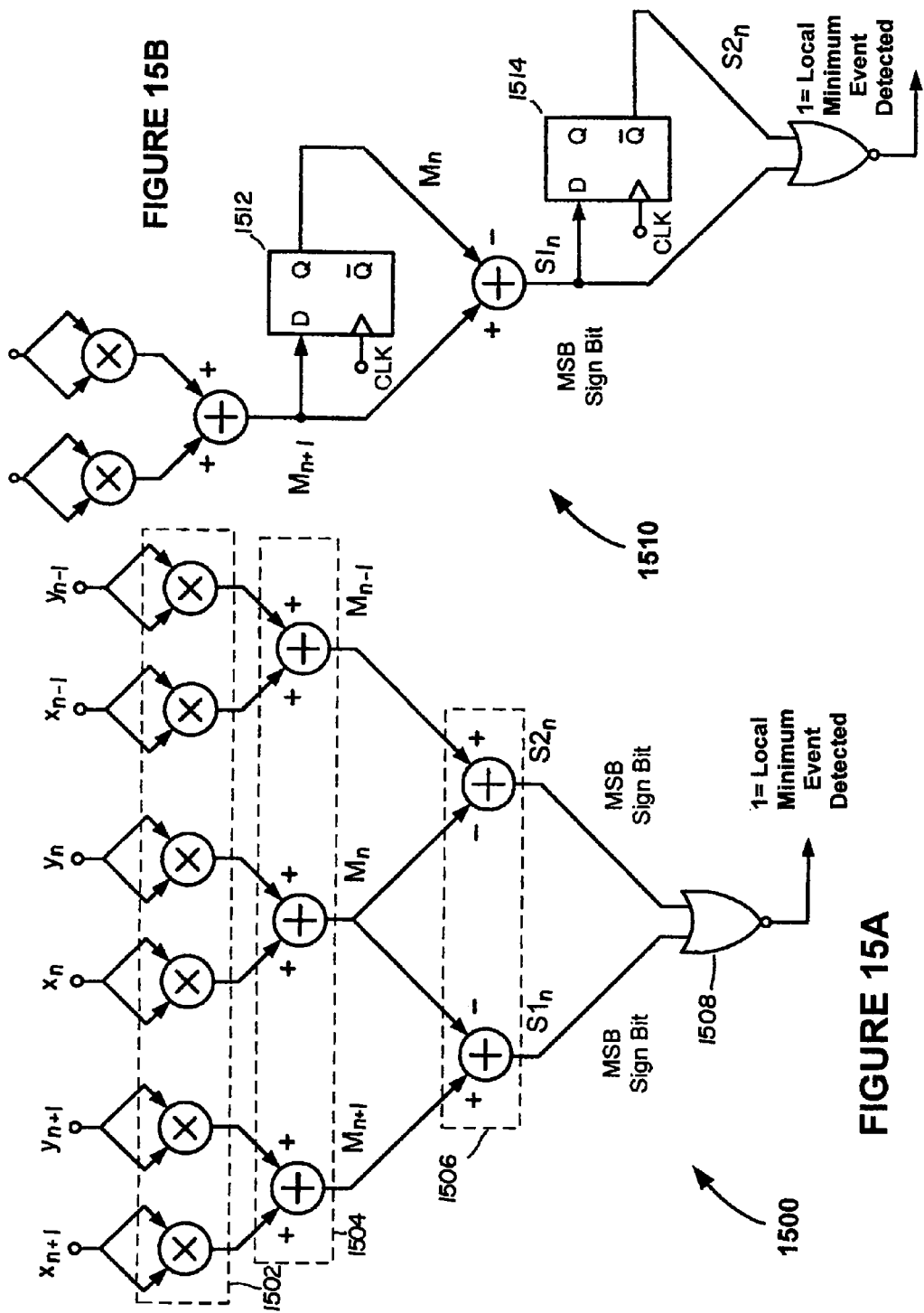
FIGS. 15A and 15B are drawings of two alternative local minimum event detection circuits, which may be used to determine a local minimum event in a three-sample set $(x_{n+1}, y_{n+1})$, $(x_n, y_n)$, $(x_{n-1}, y_{n-1})$ of samples.
Figure 16:
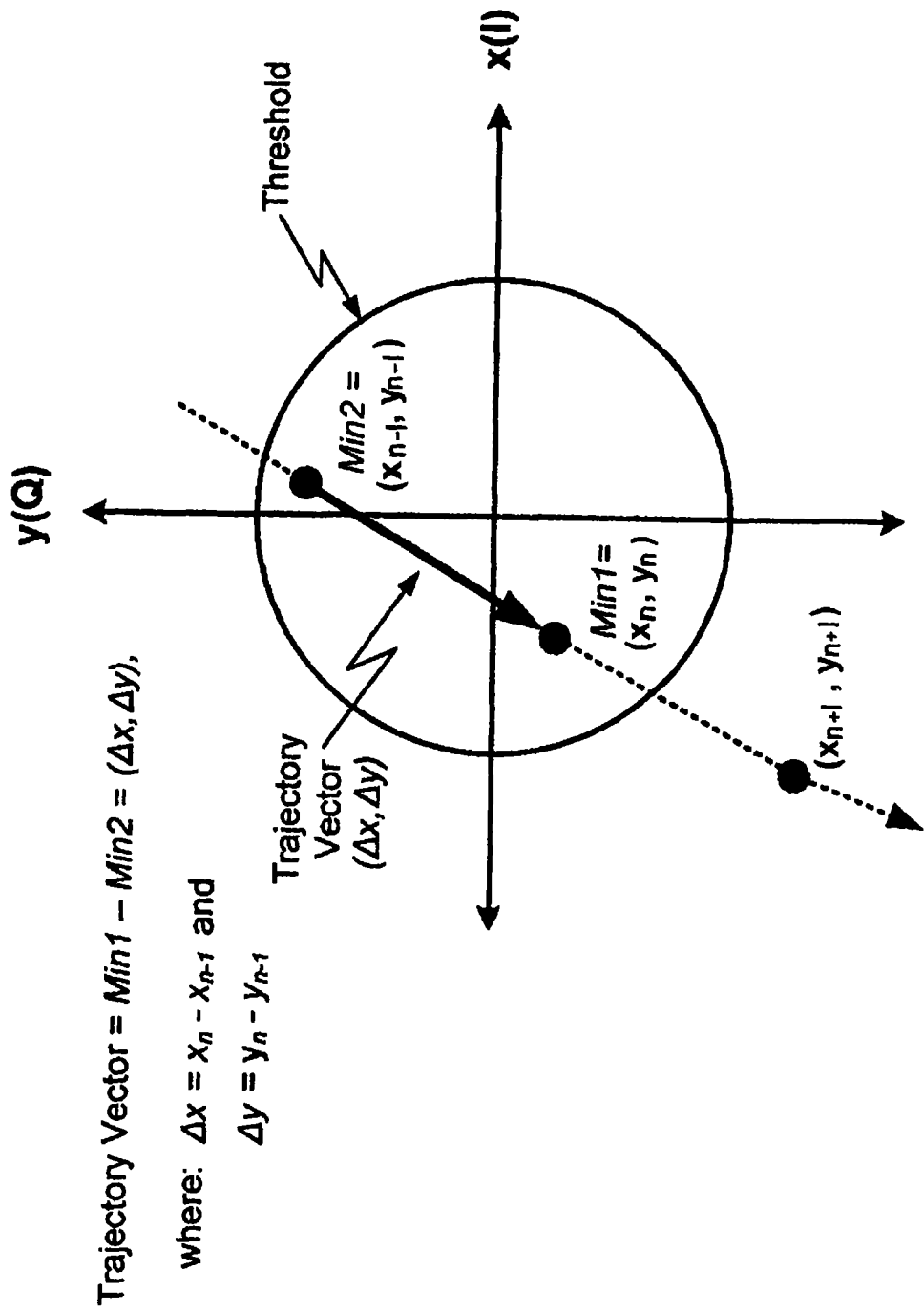
FIG. 16 is a vector diagram illustrating how the AMPR reduction method in FIG. 12 calculates a trajectory vector $(\Delta x, \Delta y)$ approximating the trajectory of the baseband signal s(t) through samples of a three-sample set $(x_{n+1}, y_{n+1})$, $(x_n, y_n)$, $(x_{n-1}, y_{n-1})$.

The flowchart in FIG. 12 and the drawings in FIGS. 13-21 illustrate in more detail the AMPR reduction method performed by the AMPR reduction circuit 916 of the baseband processor 902 in FIG. 9. (The method performed by the AMPR reduction circuit 1016 of the baseband processor 1002 in FIG. 10 is similar, except that it operates on samples that may have been previously modified, as explained above.) In the first step 1202 of the AMPR reduction method 1200 a first three-sample set of samples $(x_{n+1}, y_{n+1}), (x_n, y_n), (x_{n-1}, y_{n-1})$ is loaded into the local minimum event detector 918. Note that the samples in the first three-sample set $(x_{n+1}, y_{n+1}), (x_n, y_n), x_{n-1}, y_{n-1})$, as well as the samples in subsequent three-sample sets, may be temporally adjacent (i.e., consecutive) or sequential but nonconsecutive. Next in steps 1204 and 1206 (see FIGS. 12, 13 and 14) the local minimum event detector 918 determines which sample among the three samples in the first three-sample set $(x_{n+1}, y_{n+1}), (x_n, y_n), (x_{n-1}, y_{n-1})$ has the lowest magnitude 1204), and the sample that has the next-lowest magnitude (step 1206).

At decision 1208, the local minimum event detector 918 determines whether a local minimum event is present in the first three-sample set $(x_{n+1}, y_{n+1}), (x_n, y_n), x_{n-1}, y_{n-1})$. A local minimum event is present if the middle sample $(x_n, y_n)$ in the three-sample set $(x_{n+1}, y_{n+1}), (x_n, y_n), (x_{n-1}, y_{n-1})$ has a magnitude less then the low-magnitude threshold and is the sample among the three samples with the lowest magnitude.

If a local minimum event is not detected ("no" at decision 1208), at step 1210 the next three-sample set $(x_{n+2}, y_{n+2})$, $(x_{n+1}, y_{n+1}), (x_n, y_n)$ is loaded into the local minimum event detector 918 and steps 1204-1208 are repeated. On the other hand, if a local minimum event is detected ("yes" at decision 1208), the local minimum event detector 918 generates a "local minimum event detected" output signal, which is fed to a first input of the AND logic gate 924.

FIG. 15A is a drawing of a local minimum event detection circuit 1500 that may be used to implement the local minimum event detection portion of the local minimum event detector 918. The local minimum event detection circuit 1500 comprises a group of multipliers 1502, a first group of adders 1504, a second group of adders 1506, and a NOR logic gate 1508. The multipliers of the group of multipliers 1502 and the adders of the first and second groups of adders 1504 and 1506 may be formed in a variety of different ways. For example, the multipliers may be formed from logic gates using Wallace trees or a Dadda multipliers and the adders may be formed from logic gates using ripple-carry or carry-lookahead adders, as will be appreciated and understood by those of ordinary skill in the art. The group of multipliers 1502 and the first group of adders 1504 operate to form the sums of the squares of the x and y coordinates of each sample of the three-sample set $(x_{n+1}, y_{n+1}), (x_n, y_n), (x_{n-1}, y_{n-1})$, i.e., $[(x_{n+1})^2+(y_{n+1})^2]$, $[(x_n)^2+(y_n)^2]$, $[(x_{n-1})^2+(y_{n-1})^2]$. Collectively, these values provide an accurate indication of the relative magnitudes of the three samples. The second group of adders 1506 operates to subtract the square of the magnitude of the middle sample $(x_n, y_n)$ from the square of the magnitude of the "next" sample $(x_{n+1}, y_{n+1})$, and also subtract the square of the magnitude of the middle sample $(x_n, y_n)$ from the square of the magnitude of the "prior" sample $(x_{n-1}, y_{n-1})$. The most significant bit (MSB) sign bits at the outputs of the second group of adders 1506 determine whether the magnitude of the middle sample $(x_n, y_n)$ is the lowest magnitude among the prior, middle and next samples. If it is, the MSB sign bits at the outputs of both adders of the second group of adders 1506 are both at a logic "0" and the output of the NOR logic gate 1508 is a logic "1," indicating the detection of a local minimum event. Otherwise, the local minimum event detected output of the NOR logic gate 1508 remains at a logic "0."

FIG. 15B is a drawing of an alternative local minimum event detection circuit 1510, which may be used to implement the local minimum event detection portion of the local minimum event detector 918. The alternative local minimum event detection circuit 1510 is similar to the local minimum event detection circuit 1500 in FIG. 15A, except that it incorporates delay ("D") flip-flops 1512 and 1514. The D flip-flops 1512 and 1514 provide a pipelining function for the samples, thereby reducing the number of multipliers and adders that are needed to perform the local minimum event detection.

After the local minimum event detector 918 has detected the presence of a local minimum event at decision 1208, at step 1210 a trajectory vector $(\Delta x, \Delta y)$ approximating the trajectory of the baseband signal s(t) through the three samples is calculated. (For explanation purposes, in the description that follows, it is assumed that a local minimum event was detected in the first three-sample set $(x_{n+1}, y_{n+1})$, $(x_n, y_n), (x_{n-1}, y_{n-1})$.) According to one embodiment, illustrated in FIG. 16, the trajectory vector $(\Delta x, \Delta y)$ is defined as the vector $(Min1-Min2)=[(x_n-x_{n-1}), (y_n-y_{n-1})]=(\Delta x, \Delta y)$ between the lowest magnitude sample $(x_n, y_n)$ and the next-lowest-magnitude sample (in this example, the prior sample $(x_{n-1}, y_{n-1})$ is the next-lowest-magnitude sample). In an alternative embodiment, the trajectory vector $(\Delta x, \Delta y)$ is defined as the vector between the prior and next samples, i.e., $(\Delta x, \Delta y)=[(x_{n+1}-x_{n-1}), (y_{n+1}-y_{n-1})]$.

Figures 17A, 17B:
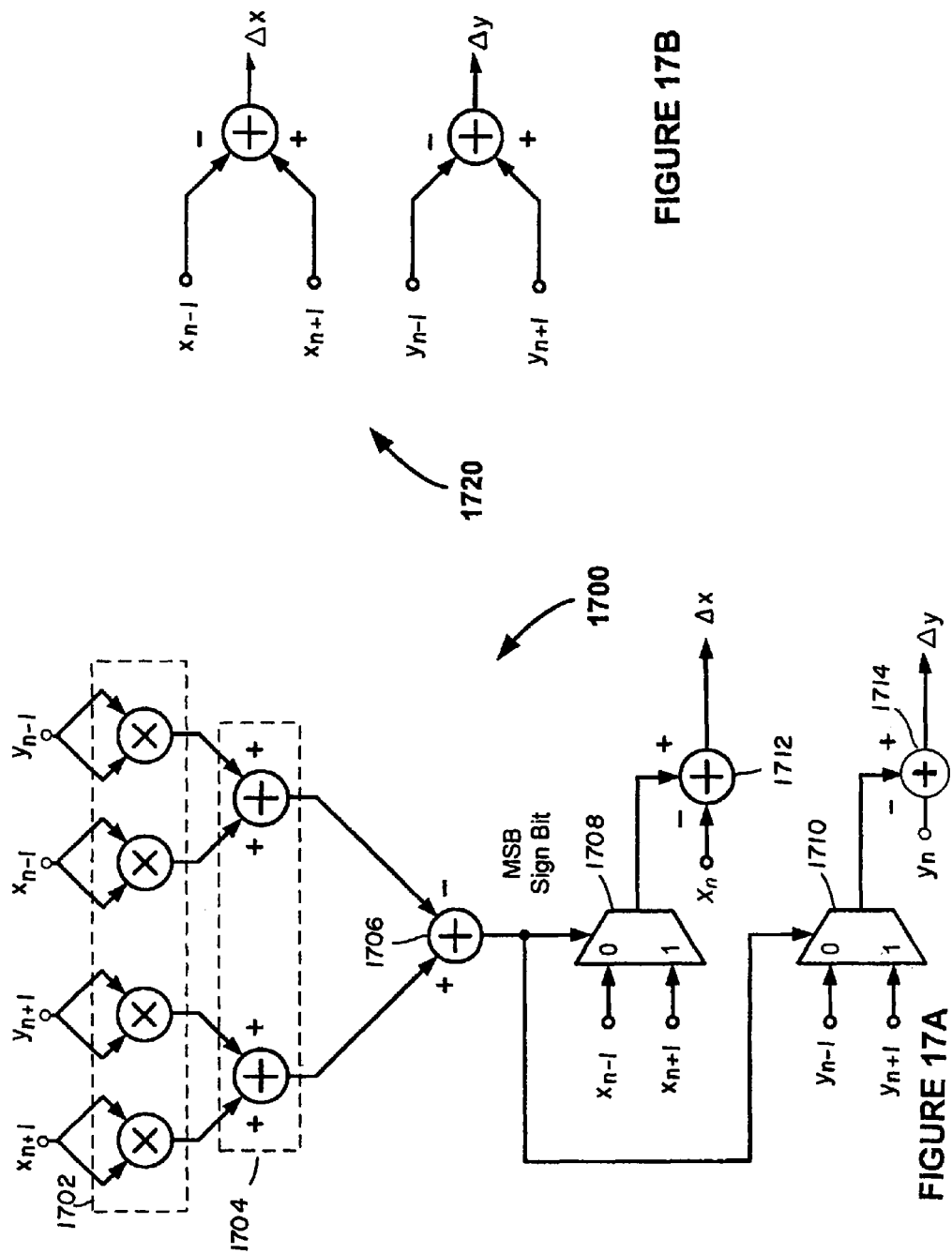
FIGS. 17A and 17B are drawings of two alternative trajectory vector calculation circuits that may be used to compute the trajectory vector $(\Delta x, \Delta y)$.

FIG. 17A a drawing of a trajectory vector calculation circuit 1700 that may be used to compute the trajectory vector in step 1212 of the AMPR reduction method 1200. The trajectory vector calculation circuit 1700 comprises a group of multipliers 1702, a first group of adders 1704, an MSB sign bit adder 1706, first and second multiplexers 1708 and 1710, and first and second output adders 1712 and 1714. The group of multipliers 1702 and first group of adders 1704 operate to determine the squares of the magnitudes of the prior and next samples $(x_{n-1}, y_{n-1})$ and $(x_{n+1}, y_{n+1})$. The MSB sign bit adder 1706 subtracts the square of the magnitude of the next sample $(x_{n+1}, y_{n+1})$ from the square of the magnitude of the prior sample $(x_{n-1}, y_{n-1})$. The MSB sign bit at the output of the MSB sign bit adder 1706 provides an indication of which of the prior and next samples $(x_{n-1}, y_{n-1})$ and $(x_{n+1}, y_{n+1})$ has the lowest magnitude. The one that has the lowest magnitude is the sample that has the next-lowest magnitude among the samples of the three-sample set $(x_{n+1}, y_{n+1})$, $(x_n, y_n)$, $(x_{n-1}, y_{n-1})$. The MSB sign bit is inputs of both the first and second multiplexers 1708 and 1710. Accordingly, if the MSB sign bit has a value indicating that the next sample $(x_{n+1}, y_{n+1})$ is the next-lowest-magnitude sample among the three-sample set $(x_{n+1}, y_{n+1})$, $(x_n, y_n)$, $(x_{n-1}, y_{n-1})$, the $x_{n+1}$ and $y_{n+1}$ coordinates of the next sample $(x_{n-1}, y_{n+1})$ are passed to the outputs of the first and second multiplexers 1708 and 1710. Otherwise, the $x_{n-1}$ and $y_{n-1}$ coordinates of the prior sample $(x_{n-1}, y_{n-1})$ are passed to the multiplexer outputs. Finally, the first and second output adders 1712 and 1714 subtract the x and y coordinates of the middle sample $(x_n, y_n)$ from the outputs of the first and second multiplexer 1708 and 1710 to produce the trajectory vector $(\Delta x, \Delta y)$.

As explained above, in an alternative embodiment, the trajectory vector $(\Delta x, \Delta y)$ is defined by the vector difference between the next and prior samples, i.e., $(\Delta x, \Delta y)=[(x_{n+1}-x_{n-1}), (y_{n+1}-y_{n-1})]$. FIG. 17B is a trajectory vector calculation circuit 1720 may be used to generate the trajectory vector $(\Delta x, \Delta y)$ according to that alternative embodiment.

Figure 18:
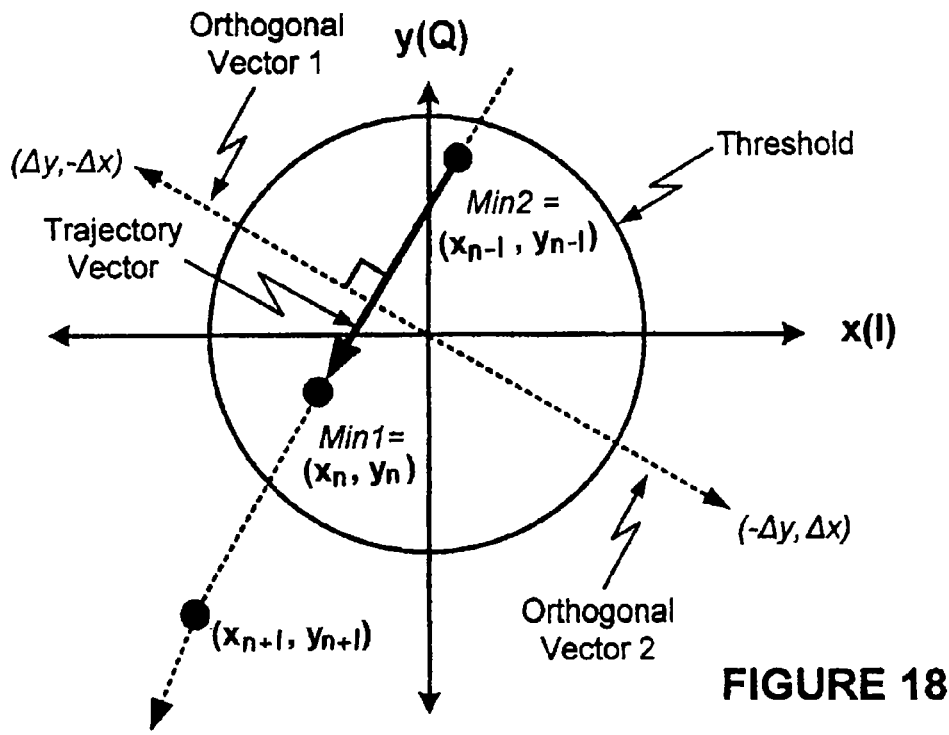
FIG. 18 is a vector diagram illustrating how the AMPR reduction method in FIG. 12 determines two vectors that are orthogonal to the trajectory vector $(\Delta x, \Delta y)$.

After the trajectory vector $(\Delta x, \Delta y)$ has been determined at step 1210, at step 1212 the orthogonal vector (i.e., the vector that is orthogonal to the trajectory vector) is determined. Given that the dot product of two orthogonal vectors is zero, the orthogonal vector is determined by solving the equation: (trajectory vector)·(orthogonal vector)=0. As shown in FIG. 18, the solution to the equation yields two opposing orthogonal vectors $(-\Delta y, \Delta x)$ and $(\Delta y, -\Delta x)$. To ensure proper AMPR reduction, it is necessary to select the orthogonal vector that has the appropriate direction. The appropriate direction is the direction that facilitates pushing the signal trajectory of the baseband signal s(t) away from the origin, rather than towards it. This selection process, which is performed in step 1214, can be performed in a variety of different ways. An exemplary orthogonal direction selection algorithm is described below.

(1) Solve for (x, y) orthogonal direction from intersection of trajectory and orthogonal vectors (see FIGS. 18 and 19):

$$by-ax=c \qquad \text{i.}$$

basic formula $$y_n\Delta x - x_n\Delta y = c \qquad \text{ii.}$$

equation for trajectory vector through $(x_n, y_n)$ $$y'\Delta x - x'\Delta y = c \qquad \text{iii.}$$

equation for trajectory vector through (x', y')

$$y_n\Delta x - x_n\Delta y = y'\Delta x - x'\Delta y \qquad \text{iv.}$$

substitute for constant c $$y' = x'\Delta x/\Delta y \qquad \text{v.}$$

equation for orthogonal vector through (x', y')

$$y_n\Delta x - x_n\Delta y = (x'\Delta x/\Delta y)\Delta x - x'\Delta y \qquad \text{vi.}$$

substitute for y' in equation vi and solve for x'

$$-\Delta y(y_n\Delta x - x_n\Delta y) = (\Delta x^2 + \Delta y^2)x' \qquad \text{vii.}$$

$(\Delta x^2 + \Delta y^2)$ is positive and can be dropped $$-\Delta y(y_n\Delta x - x_n\Delta y) = x' \qquad \text{viii.}$$

$$y_n\Delta x - x_n\Delta y = y'\Delta x - (y'\Delta y/\Delta x)\Delta y \qquad \text{ix.}$$

substitute for x' in equation vi and solve for y'

$$\Delta x(y_n\Delta x - x_n\Delta y) = (\Delta x^2 + \Delta y^2)y' \qquad \text{x.}$$

$(\Delta x^2 + \Delta y^2)$ is positive and can be dropped $$\Delta x(y_n\Delta x - x_n\Delta y) = y' \qquad \text{xi.}$$

(2) Sign of (x, y) used to find appropriate direction of orthogonal vector.

Figure 19:
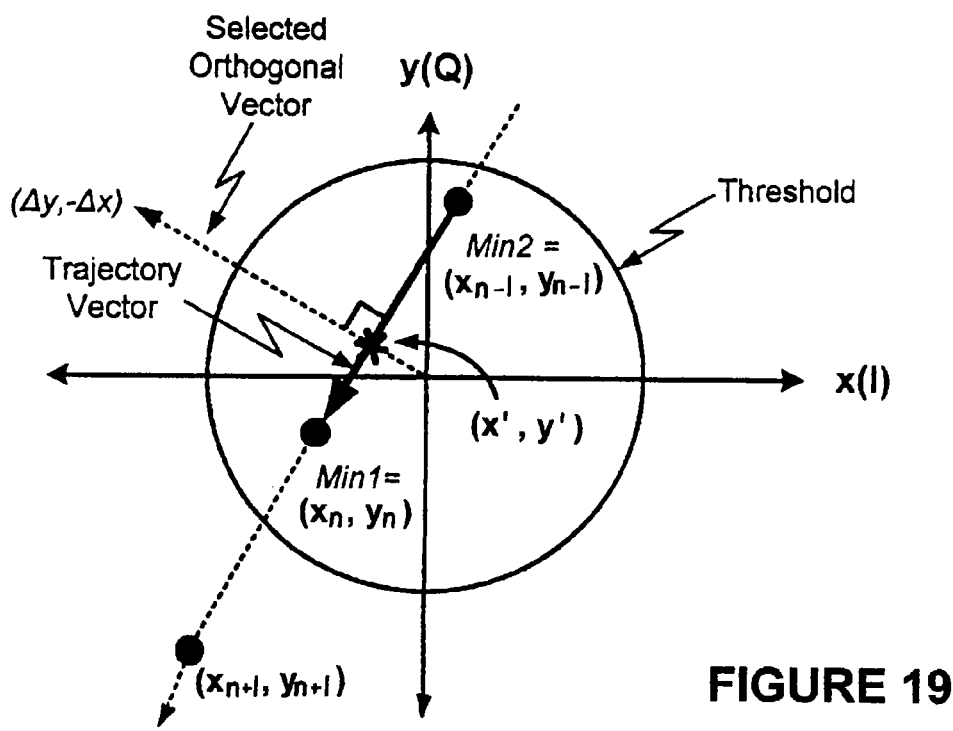
FIG. 19 is a vector diagram illustrating how the AMPR reduction method in FIG. 12 selects the one of the two orthogonal vectors in FIG. 18 that facilitates pushing the signal trajectory of the baseband signal s(t) away from the origin rather than towards it.

In the example provided here, the orthogonal vector $(\Delta y, -\Delta x)$ is determined and selected to be the appropriate orthogonal vector. The orthogonal vector $(\Delta y, -\Delta x)$ and its direction are shown in FIG. 19.

Figure 20:
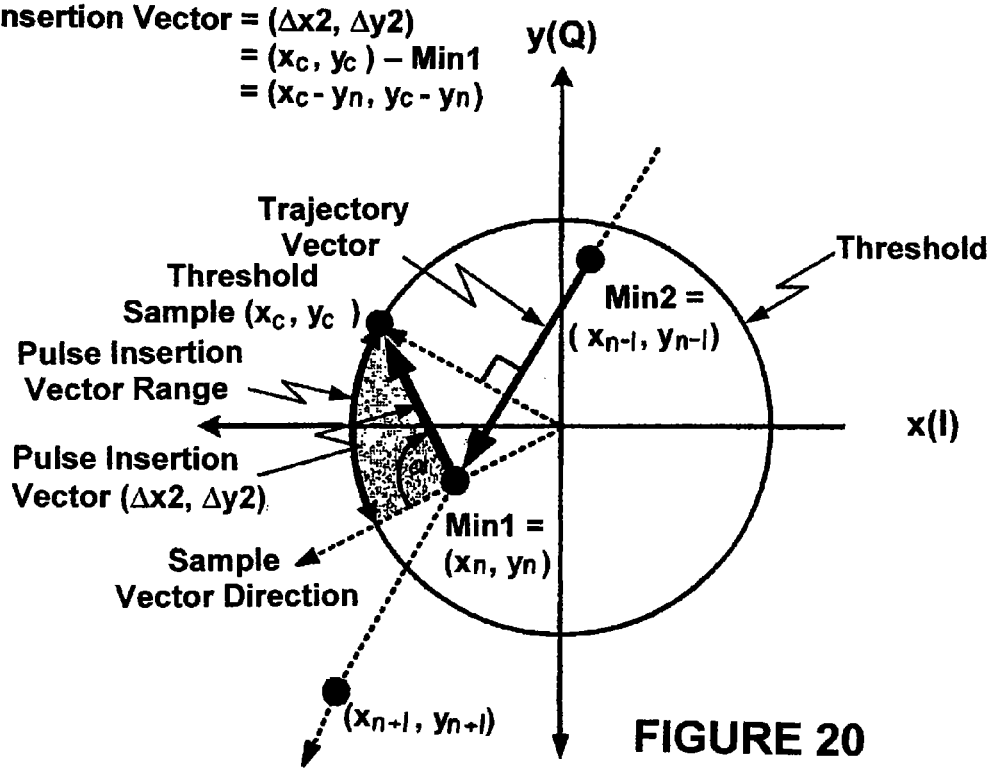
FIG. 20 is a vector diagram illustrating how the AMPR reduction method in FIG. 12 generates and locates a threshold sample $(x_c, y_c)$ on the low-magnitude threshold circle.

After the appropriate orthogonal vector is determined at step 1214, at step 1216 the coordinates of the orthogonal vector are used as a reference into the circle LUT 922 to retrieve a threshold sample $(x_c, y_c)$ that intersects with both the low-magnitude threshold circle and the orthogonal vector. The threshold sample $(x_c, y_c)$ and its relationship to the orthogonal vector are shown in FIG. 20.

Figure 21:
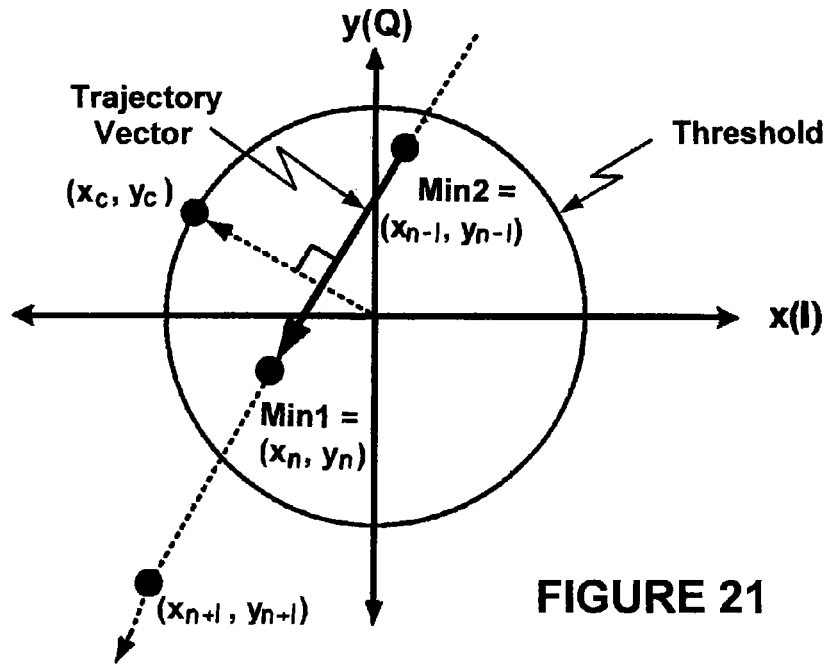
FIG. 21 is a vector diagram illustrating how the AMPR reduction method in FIG. 12 generates a pulse insertion vector $(\Delta x2, \Delta y2)$ from the lowest-magnitude sample $(x_n, y_n)$ and the threshold sample $(x_c, y_c)$.

After the threshold sample $(x_c, y_c)$ has been determined at step 1216, at step 1218 the x and y coordinates of the lowest-magnitude middle sample $(x_n, y_n)$ are subtracted from the x and y coordinates of the threshold sample $(x_c, y_c)$ to determine the pulse insertion vector $(\Delta x2, \Delta y2)$, as shown in FIG. 21. In an alternative embodiment, the AMPR-reduction circuit 916 (pr 1016) is configured to set the pulse insertion vector so that it terminates on the low-magnitude threshold circle but so that it can have any angle a within the range of angles between the sample vector direction and the direction of the vector formed by the difference between the orthogonal vector terminating at the threshold sample $(x_c, y_c)$ and the vector defining the middle sample $(x_n, y_n)$, i.e., an angle within the pulse insertion vector range (shaded area in FIG. 21).

Finally, at step 1220 a complex insertion pulse provided by the pulse generator 926 is scaled by the pulse insertion vector $(\Delta x2, \Delta y2)$ to provide the desired, scaled complex insertion pulse, which is finally added to the baseband signal s(t) in the temporal vicinity of the lowest magnitude middle sample $(x_n, y_n)$ to locally reduce the AMPR of the baseband signal s(t). (Note that if a local minimum event was not previously detected at decision 1208, the output of the AND logic gate 924 would be zero, in which case a zero-valued insertion pulse would be produced, effectively resulting in a zero-valued insertion pulse being combined with the baseband signal s(t).)

After the scaled complex insertion pulse has been combined with the baseband signal s(t), the next three-sample set of samples $(x_{n+2}, y_{n+2})$, $(x_{n+1}, y_{n+1})$, $(x_n, y_n)$ is loaded into the local minimum event detector 918 and steps 1204 and the remaining steps are repeated. The method 1200 is continuously repeated in the above-described manner until the RF transmitter 900 (or 1000, if it is used) enters a non-transmit or powered down state.

As the AMPR reduction circuit 916 (or AMPR reduction 1016) operates to reduce the AMPR of the baseband signal s(t), a modified baseband signal ŝ(t) having a lower AMPR is produced. The DAC 904 converts the modified baseband signal ŝ(t) to an analog baseband signal, which is then upconverted to RF by the frequency upconverter 906 and applied to the RF input RFin of the PA 908. Finally, the antenna 910 radiates the amplified and modulated RF carrier signal over the air to a remote receiver.

Figure 22:
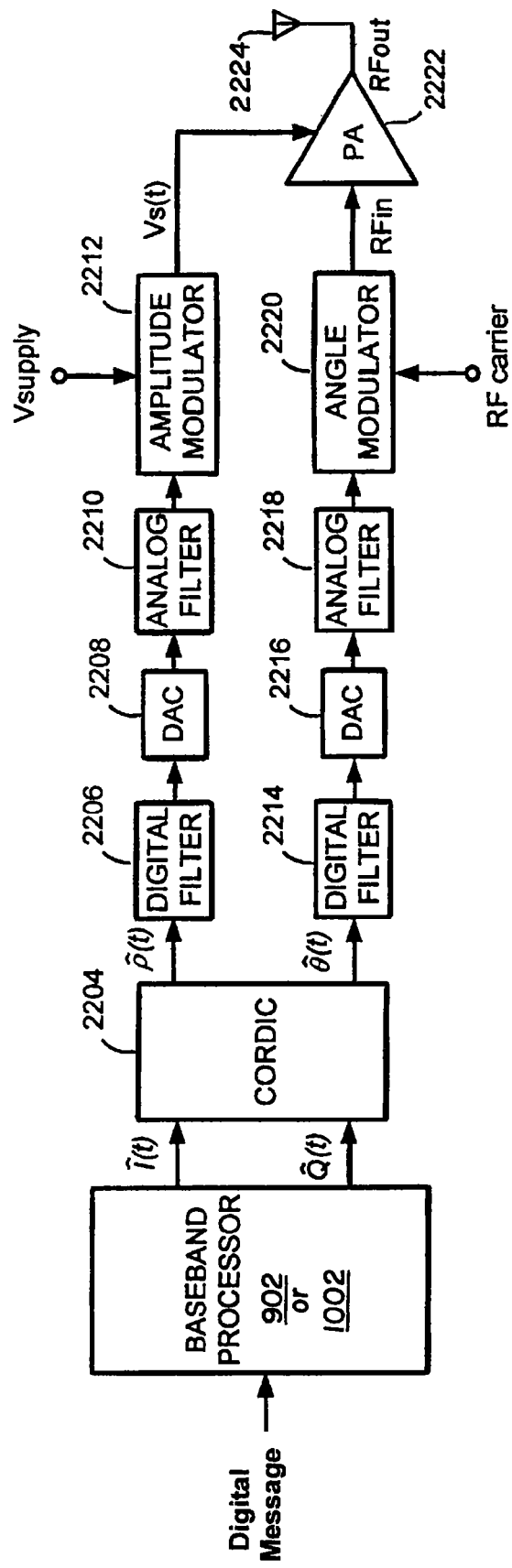
FIG. 22 is a drawing of a polar transmitter that is adapted to include the AMPR-reducing methods and apparatus of the present invention.

The AMPR-reducing methods and apparatus described above can be advantageously employed in any type of transmitter in which a high AMPR is of concern. For example, FIG. 22 illustrates how the AMPR-reducing methods and apparatus of the present invention may be used to reduce high-frequency events in the amplitude and angle component signals ρ(t) and θ(t) of a polar transmitter 2200. The polar transmitter 2200 comprises a baseband processor 902 (or 1002) including an AMPR reduction circuit similar to the AMPR reduction circuit 916 (or 1016) in FIGS. 9 and 10; a Coordinate Rotation Digital Computer (CORDIC) converter (i.e., rectangular-to-polar converter) 2204; an amplitude path including an amplitude path digital filter 2206, amplitude path DAC 2208, amplitude path analog filter 2210 and amplitude modulator 2212; an angle path including an angle path digital filter 2214, angle path DAC 2216, angle path analog filter 2218 and angle modulator 2220; a PA 2222; and an antenna 2224.

The AMPR reduction circuit 916 (or 1016) operates on the baseband signal s(t)=I(t)+jQ(t) as described above, to provide a modified baseband signal ŝ(t) comprised of modified I and Q signal components Î(t) and Q̂(t). The modulation scheme employed by the baseband modulator 912 of the baseband processor 902 (or 1002) is a non-constant envelope modulation scheme. According to one embodiment, the baseband modulator 912 is configured to generate a baseband signal s(t) that is formatted according to the HPSK non-constant envelope modulation scheme specified by the 3GPP for use in 3G UMTS systems. In another embodiment, the baseband modulator 912 is configured to employ a non-constant envelope modulation scheme specified for use in the 3G High-Speed Packet Access (HSPA) communication protocols. In yet another embodiment, the polar transmitter 2200 is configured for operation in a wireless LAN and the baseband modulator 912 is configured to employ an OFDM non-constant envelope scheme, such as specified by the IEEE 802.11 body of standards.

After the unmodified baseband signal s(t)=I(t)+jQ(t) has been generated, and the AMPR reduction circuit 916 (or 1016) has reduced the AMPR of the baseband signal s(t) to produce the desired AMPR-reduced baseband signal ŝ(t)=Î(t)+jQ̂(t), the CORDIC converter 2204 converts the rectangular-coordinate modified Î(t) and Q̂(t) signal components of the modified baseband signal ŝ(t) to digital polar-coordinate modified amplitude and angle component signals ρ̂(t) and θ̂(t).

Due to the prior AMPR-reducing operation performed by the AMPR reduction circuit 916 (or 1016), the digital polar-coordinate amplitude and angle component signals ρ̂(t) and θ̂(t) have reduced high-frequency content. The reduced high-frequency content is advantageous for a number of reasons. First, it eliminates the need for, or at least reduces the design specifications of, the amplitude and angle path digital filters 2206 and 2214 and the amplitude and angle path analog filters 2210 and 2218. For example, in one embodiment the amplitude and angle path analog filters 2210 and 2218 were able to be implemented as $3^{rd}$ order Bessel low-pass analog filters having cut-off frequencies of 15 MHz and 30 MHz, respectively, whereas similar performance without the benefit of the AMPR-reducing methods and apparatus of the present invention required $5^{th}$ order filters with higher cut-off frequencies and more complex linear and non-linear digital filters. Application of the AMPR-reducing methods and apparatus of the present invention also allowed the design requirements of the PA 2222 to be relaxed, particularly its required dynamic range.

After the digital polar-coordinate amplitude component signals ρ̂(t) have been filtered by the amplitude path digital filters 2206, converted to an analog amplitude modulation signal by the amplitude path DAC 2208 and, and filtered by the amplitude path analog filter 2210 in the amplitude path, the amplitude modulator 2212 modulates a direct current power supply voltage Vsupply according to the amplitude information in the analog amplitude modulation signal. The resulting amplitude-modulated power supply signal Vs(t) is coupled to the power supply port of the PA 2222. Meanwhile, in the angle path the angle modulator 2220 operates to modulate an RF carrier signal according to the angle information in the analog angle modulation signal provided at the output of the angle path analog filter 2218. The resulting angle-modulated RF carrier signal is applied to the RF input RFin of the PA 2222.

The PA 2222 comprises an amplifier having a final-stage switch-mode type of PA (e.g., as a Class D, E or F switch-mode PA) operating between compressed and cut-off states. As the PA 2222 amplifies the angle-modulated RF carrier signal produced at the output of the angle modulator 2220 the envelope information in the amplitude-modulated power supply signal Vs(t) from the amplitude modulator 2212 is restored at the RF output RFout of the PA 2222. Finally, the antenna 2224 radiates the final amplified amplitude- and angle-modulated RF carrier signal over the air to a remote receiver.

Figure 23:
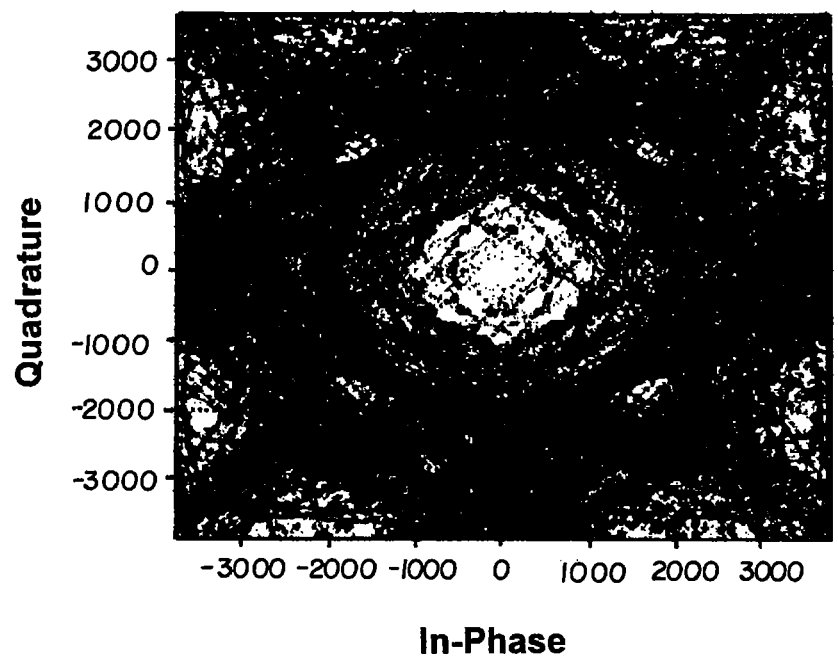
FIGS. 23A and 23B are signal trajectory diagrams obtained from simulations performed on a polar transmitter, similar to the polar transmitter in FIG. 22, highlighting and comparing the hole blowing effect for two different pulse insertion vectors.
Figure 23B:
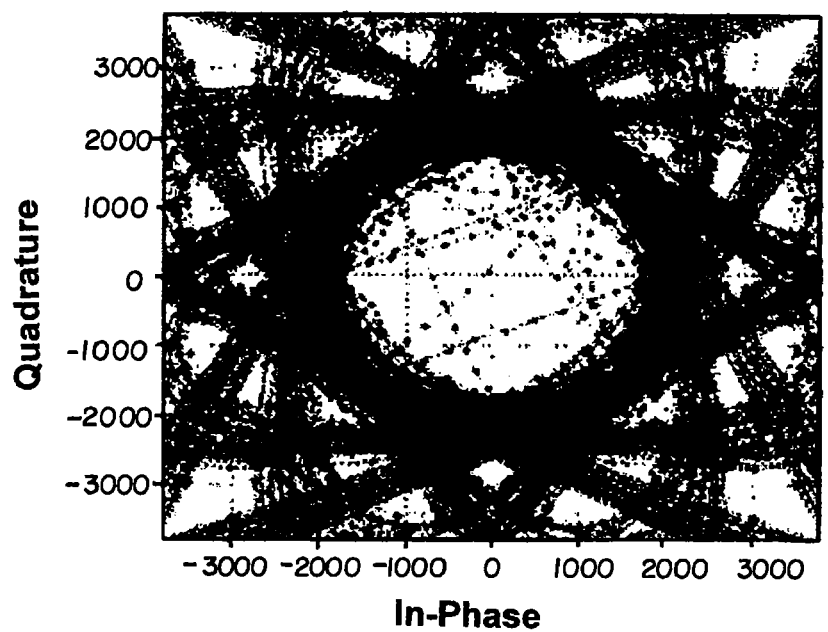

FIGS. 23A and 23B are signal trajectory diagrams obtained from simulations performed on a polar transmitter, similar to the polar transmitter 2200 in FIG. 22, in which the polar transmitter was configured to process and transmit HSDPA signals. The signal trajectory diagrams illustrate the effectiveness of the AMRP-reducing methods and apparatus of the present invention in reducing the AMPR of the HSDPA signals for pulse insertion vectors at the boundaries of the pulse insertion vector range (shaded area in FIG. 21). In particular, the simulation results in FIG. 23A were obtained using a pulse insertion vector having the same direction as the sample vector, while the simulation results in FIG. 23B were obtained using a pulse insertion vector having an angle defining the other extreme of the pulse insertion vector range, i.e., a pulse insertion vector determined by the vector difference between the vector defining the lowest-magnitude sample $(x_n, y_n)$ and the orthogonal vector defining the threshold sample $(x_c, y_c)$, as shown in FIG. 21.

Comparing the signal trajectory diagrams in FIGS. 23A and 23B reveals that the degree to which hole blowing occurs (and AMPR reduced) varies depending on what angle a the pulse insertion vector is set to within the pulse insertion vector range. The signal trajectory diagrams in FIGS. 23A and 23B both show hole blowing effects and consequent reductions in AMPR. However, the hole blowing effect is more pronounced in FIG. 23B than it is in FIG. 23A, as expected since the magnitude of the pulse insertion vector is larger in the former case.

The dependence of the hole blowing effect on the angle α the pulse insertion vector can be exploited during design to control the amount of AMPR reduction performed on a signal. It can also be used to help satisfy a required or desired balance or combination of in-band and out-of-band noise performance characteristics. For example, for a design imposing strict limits on out-of-band noise, or a design having hardware constraints (for example, a PA with limited dynamic range), a more aggressive hole blowing approach with a pulse insertion vector having a large angle α and large magnitude, such as the pulse insertion vector (Δx2, Δy2) in FIG. 21 could be used. On the other hand, for designs focusing more on limiting or controlling in-band noise, a less aggressive hole blowing approach in which a smaller magnitude pulse insertion vector having an angle α closer to zero, i.e., more toward the sample vector direction, could be used.

Figure 24:
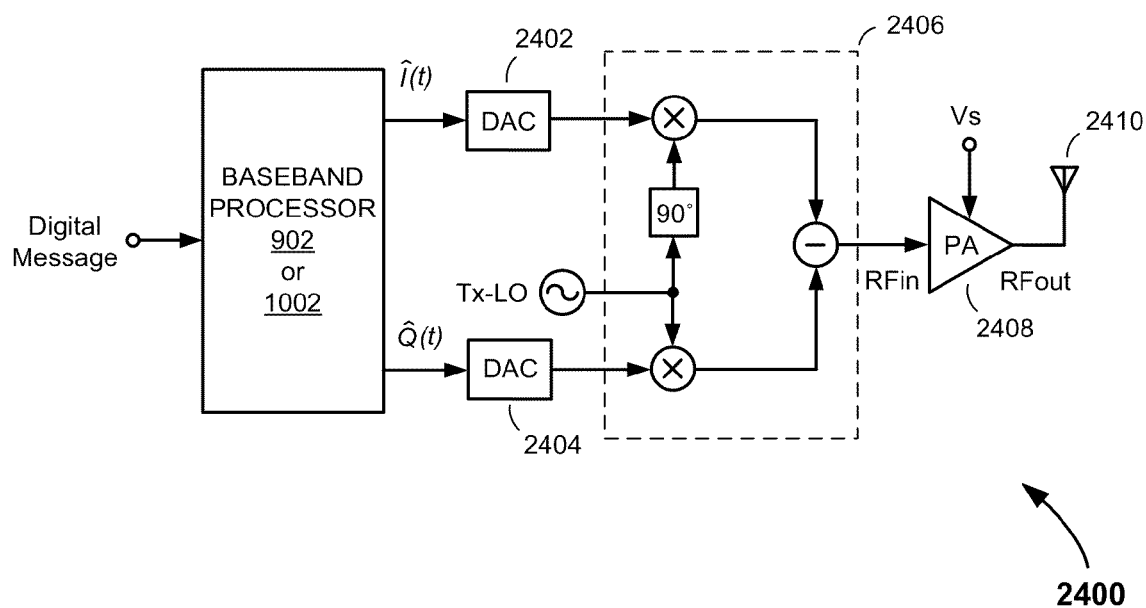
FIG. 24 is a drawing of a quadrature-modulator-based transmitter that is adapted to include the AMPR-reducing methods and apparatus of the present invention.

As explained above, the AMPR-reducing methods and apparatus of the present invention may be exploited in other transmitter topologies. FIG. 24 shows, for example, how the AMPR-reducing methods and apparatus of the present invention are used in a quadrature-modulator-based transmitter 2400. The quadrature-modulator-based transmitter 2400 comprises a baseband processor 902 (or 1002) including an AMPR reduction circuit 916 (or 1016) similar to the AMPR reduction circuit 916 (or 1016) in FIG. 9 (or FIG. 10); an I-channel DAC 2402; a Q-channel DAC 2404; a quadrature modulator 2406; a PA 2408; and an antenna 2410. The AMPR reduction circuit 916 (or 1016) operates on the baseband signal $s(t)=I(t)+jQ(t)$ as described above, to provide a modified baseband signal $\hat{s}(t)$ comprised of modified I and Q signal components $\hat{I}(t)$ and $\hat{Q}(t)$. The modified I and Q signal components $\hat{I}(t)$ and $\hat{Q}(t)$ are converted to analog signals by the I- and Q-channel DACs 2402 and 2404, and then upconverted to RF and combined by the quadrature modulator 2406. The PA 2408 comprises a linear PA (e.g., a Class A, B or AB PA) that operates to amplify the modulated RF carrier signal produced at the output of the quadrature modulator 2406. Finally, the antenna 2410 radiates the amplified and modulated RF carrier signal over the air to a remote receiver. Due to the prior reduction in AMPR of the I and Q signal components, the extent to which power must be backed off to maintain PA linearity is reduced, thereby easing the design requirements of the PA 2408, in particular its required dynamic range.

While various embodiments of the present invention have been described above, it should be understood that they have been presented by way of example, and not limitation. It will be apparent to persons skilled in the relevant art that various changes in form and detail may be made therein without departing from the spirit and scope of the invention. The scope of the invention should, therefore, be determined not with reference to the above description, but should instead be determined with reference to the appended claims, along with the full scope of equivalents to which such claims are entitled.

What is claimed is:

1. A method of reducing the average-to-minimum power ratio (AMPR) of communications signals in a communications transmitter, comprising:
   generating samples of a baseband signal that is formatted in accordance with a non-constant envelope modulation scheme;
   detecting whether a local minimum event is present among samples in an N-sample set of said samples, where N is an integer greater than or equal to three; and
   if a local minimum event is detected among the samples in said N-sample set of samples, modifying said baseband signal in the temporal vicinity of the detected local minimum event to form a modified baseband signal having a reduced AMPR,
   wherein detecting whether a local minimum event is present comprises detecting samples in said N-sample set that have magnitudes less than a low-magnitude threshold and identifying a lowest-magnitude sample from among samples of said N-sample set detected to have magnitudes less than said low-magnitude threshold.

2. The method of claim 1, further comprising calculating a trajectory vector approximating the signal trajectory of said baseband signal through said lowest-magnitude sample.

3. The method of claim 2 wherein modifying said baseband signal comprises:
   generating a pulse insertion vector;
   scaling an insertion pulse by said pulse insertion vector to form a scaled insertion pulse; and
   combining said scaled insertion pulse with said baseband signal in the temporal vicinity of the detected local minimum event to form said modified baseband signal.

4. The method of claim 3 wherein a magnitude and angle of said pulse insertion vector are set based on the magnitude and phase of a vector defining said lowest-magnitude sample.

5. The method of claim 4 wherein the magnitude and angle of said pulse insertion vector are set also based on the magnitude and phase of a vector that is orthogonal to said trajectory vector.

6. The method of claim 1, further comprising repeating said detecting and modifying steps for a subsequent N-sample set, at least one sample of the subsequent N-sample set including a sample from the prior N-sample set.

7. A baseband circuit for a communications transmitter configured to reduce the average-to-minimum power ratio (AMPR) of a communications signal, comprising:
   a local minimum event detection circuit configured to detect a low-magnitude sample in a set of samples of a baseband signal, said low-magnitude sample having a magnitude less than a predetermined low-magnitude threshold;
   circuitry configured to generate a pulse insertion vector having an angle that can be set to an angle within a range of angles between the direction of a vector defining a detected low-magnitude sample and the direction of a vector that is orthogonal to a trajectory of said baseband signal in the temporal vicinity of said detected low-magnitude sample;
   a multiplier circuit configured to scale an insertion pulse by said pulse insertion vector to provide a scaled insertion pulse; and
   combining circuitry configured to combine said scaled insertion pulse with said baseband signal in the temporal vicinity of said detected low-magnitude sample to form a modified baseband signal having a reduced AMPR,
   wherein further the local minimum event detection circuit configures to identify a lowest-magnitude sample from among samples of an N-sample set detected to have magnitudes less than said low-magnitude threshold, N is an integer greater than or equal to three.

8. The baseband circuit of claim 7 wherein the angle of said pulse insertion vector can be set to an angle within a range of angles between the direction of the vector defining said detected low-magnitude sample and the direction of a vector formed by a difference between a vector that is orthogonal to said trajectory and has a magnitude equal to said low-magnitude threshold and the vector defining said detected low-magnitude sample.

9. The baseband circuit of claim 7, further comprising a trajectory vector calculation circuit configured to calculate a trajectory vector approximating said trajectory of said baseband signal in the temporal vicinity of said detected low-magnitude sample.

10. The baseband circuit of claim 7 wherein at least one sample in the set of samples presented to said local minimum event detection circuit has been subject to a prior AMPR reduction operation.

11. A baseband circuit for a communications transmitter configured to reduce the average-to-minimum power ratio (AMPR) of a communications signal, comprising:
a local minimum event detection circuit configured to detect whether a sample in an N-sample set of samples of a baseband signal has a magnitude less than a low-magnitude threshold, where N is an integer greater than or equal to three;
circuitry configured to generate a pulse insertion vector if said local minimum event detection circuit detects a low-magnitude sample having a magnitude less than said low-magnitude threshold;
a multiplier circuit configured to scale an insertion pulse by said pulse insertion vector to provide a scaled insertion pulse; and
combining circuitry configured to combine said scaled insertion pulse with said baseband signal in the temporal vicinity of said detected low-magnitude sample to form a modified baseband signal having a reduced AMPR,
wherein further the local minimum event detection circuit configures to identify a lowest-magnitude sample from among samples of said N-sample set detected to have magnitudes less than said low-magnitude threshold.

12. The baseband circuit of claim 11, further comprising a trajectory vector calculation circuit configured to calculate a trajectory vector approximating the trajectory of said baseband signal in the temporal vicinity of said detected low-magnitude sample.

13. The baseband circuit of claim 12 wherein said circuitry configured to generate said pulse insertion vector is configured to generate a pulse insertion vector having an angle within a range of angles between the direction of a vector defining said detected low-magnitude sample and the direction of a vector that is orthogonal to said trajectory vector.

14. The baseband circuit of claim 13 wherein said circuitry configured to generate said pulse insertion vector is configured to generate a pulse insertion vector having an angle within a range of angles between the direction of the vector defining said detected low-magnitude sample and the direction of a vector formed by a difference between a vector that is orthogonal to said trajectory vector and has a magnitude equal to said low-magnitude threshold and the vector defining said detected low-magnitude sample.

15. The baseband circuit of claim 12 wherein the N-sample set of samples presented to said local minimum detection circuit includes at least one sample that has been subject to a prior AMPR reduction operation.

16. A communications transmitter, comprising:
a baseband processor;
a frequency upconverter configured to receive an average-to-minimum power (AMPR)-reduced baseband signal from said baseband processor; and
a power amplifier configured to receive an upconverted AMPR-reduced signal from said frequency upconverter, wherein said baseband processor includes:
a baseband modulator configured to generate a sequence of symbols formatted in accordance with a non-constant envelope modulation scheme,
a pulse-shaping filter configured to band-limit said sequence of symbols and provide a sequence of samples representing a baseband signal, and
an AMPR reduction circuit coupled between said pulse-shaping filter and an output of said baseband processor, said AMPR reduction circuit including:
a local minimum event detection circuit configured to detect whether a sample in an N-sample set of baseband samples has a magnitude less than a low-magnitude threshold, where N is an integer greater than or equal to three,
circuitry configured to generate a pulse insertion vector if said local minimum event detection circuit detects a low-magnitude sample having a magnitude less than said low-magnitude threshold,
a multiplier circuit configured to scale an insertion pulse by said pulse insertion vector to provide a scaled insertion pulse, and
combining circuitry configured to combine said scaled insertion pulse with said baseband signal in the temporal vicinity of said detected low-magnitude sample to form said AMPR-reduced baseband signal,
wherein further the local minimum event detection circuit configures to identify a lowest-magnitude sample from among samples of said N-sample set detected to have magnitudes less than said low-magnitude threshold.

17. The communications transmitter of claim 16 wherein said AMPR reduction circuit is configured in a feed-forward arrangement between said pulse-shaping filter and an output of said baseband processor, and all samples in said N-sample set of baseband samples presented to said local minimum detection circuit have not been modified by said AMPR reduction circuit.

18. The communications transmitter of claim 16 wherein said AMPR reduction circuit is configured in a feedback arrangement between said pulse-shaping filter and an output of said baseband modulator, and at least one sample in said N-sample set of baseband samples presented to said local minimum detection circuit has been previously modified by said AMPR reduction circuit.

19. The communications transmitter of claim 16 wherein said AMPR reduction circuit further comprises a trajectory vector calculation circuit configured to calculate a trajectory vector approximating the trajectory of said baseband signal in the temporal vicinity of said detected low-magnitude sample.

20. The communications transmitter of claim 19 wherein the circuitry configured to generate said pulse insertion vector is configured to generate a pulse insertion vector having an angle within a range of angles between the direction of a vector defining said detected low-magnitude sample and the direction of a vector that is orthogonal to said trajectory vector.

21. The communications transmitter of claim 19 wherein the circuitry configured to generate said pulse insertion vector is configured to generate a pulse insertion vector having an angle within a range of angles between the direction of the vector defining said detected low-magnitude sample and the direction of a vector formed by a difference between a vector that is orthogonal to said trajectory vector and has a magnitude equal to said low-magnitude threshold and the vector defining said detected low-magnitude sample.

22. A communications transmitter, comprising:
a baseband processor;
a frequency upconverter configured to receive an average-to-minimum power (AMPR)-reduced baseband signal from said baseband processor; and
a power amplifier configured to receive an upconverted AMPR-reduced signal from said frequency upconverter, wherein said baseband processor includes:
a baseband modulator configured to generate a sequence of symbols formatted in accordance with a non-constant envelope modulation scheme,
a pulse-shaping filter configured to band-limit said sequence of symbols and provide a sequence of samples representing a baseband signal, and
an AMPR reduction circuit coupled between said pulse-shaping filter and an output of said baseband processor, said AMPR reduction circuit including:
a local minimum event detection circuit configured to detect a low-magnitude sample in a set of baseband signal samples, said low-magnitude sample having a magnitude less than a predetermined low-magnitude threshold,
circuitry configured to generate a pulse insertion vector having an angle that can be set to an angle within a range of angles between the direction of a vector defining a detected low-magnitude sample and the direction of a vector that is orthogonal to a trajectory of said baseband signal in the temporal vicinity of said detected low-magnitude sample,
a multiplier circuit configured to scale an insertion pulse by said pulse insertion vector to provide a scaled insertion pulse, and
combining circuitry configured to combine said scaled insertion pulse with said baseband signal in the temporal vicinity of said detected low-magnitude sample to form said AMPR-reduced baseband
wherein further the local minimum event detection circuit configures to identify a lowest-magnitude sample from among samples of and N-sample set detected to have magnitudes less than said low-magnitude threshold, N is an integer greater than or equal to three.

23. The communications transmitter of claim 22 wherein the circuitry configured to generate said pulse insertion vector is configured to set an angle of said pulse insertion vector within a range of angles between the direction of the vector defining said detected low-magnitude sample and the direction of a vector formed by a difference between a vector that is orthogonal to said trajectory and has a magnitude equal to said low-magnitude threshold and the vector defining said detected low-magnitude sample.

24. The communications transmitter of claim 22 wherein said AMPR reduction circuit further comprises a trajectory vector calculation circuit configured to calculate a trajectory vector approximating the trajectory of said baseband signal in the temporal vicinity of said detected low-magnitude sample.

25. The communications transmitter of claim 22 wherein said set of baseband signal samples comprises an N-sample set, where N is an integer greater than or equal to three.

26. The communications transmitter of claim 22 wherein said AMPR reduction circuit is configured in a feed-forward arrangement between said pulse-shaping filter and an output of said baseband processor, and all samples in the set of baseband signal samples presented to said local minimum detection circuit have not been modified by said AMPR reduction circuit.

27. The communications transmitter of claim 22 wherein said AMPR reduction circuit is configured in a feedback arrangement between said pulse-shaping filter and an output of said baseband processor, and at least one sample in the set of baseband signal samples presented to said local minimum detection circuit has been previously modified by said AMPR reduction circuit.

28. A polar transmitter, comprising:
a baseband processor including an average-to-minimum power ratio (AMPR) reduction circuit configured to reduce the AMPR of a rectangular-coordinate baseband signal and provide an AMPR-reduced rectangular-coordinate baseband signal;
a rectangular-to-polar converter configured to convert said AMPR-reduced rectangular-coordinate baseband signal to a polar-coordinate baseband signal having amplitude and angle components;
an amplitude modulator configured to generate an amplitude-modulated power supply signal from the amplitude component of said polar-coordinate baseband signal;
an angle modulator configured to generate an angle-modulated carrier signal from the angle component of said polar-coordinate baseband signal; and
a power amplifier having a first input configured to receive said amplitude-modulated power supply signal, a second input configured to receive said angle modulated carrier signal, and an output configured to provide an amplitude- and angle-modulated carrier signal, wherein said baseband processor includes:
a baseband modulator configured to generate a sequence of symbols formatted in accordance with a non-constant envelope modulation scheme,
a pulse-shaping filter configured to band-limit said sequence of symbols and provide a sequence of samples representing said rectangular-coordinate baseband signal, and
an AMPR reduction circuit coupled between said pulse-shaping filter and an output of said baseband processor, said AMPR reduction circuit including:
a local minimum event detection circuit configured to detect whether a sample in an N-sample set of baseband samples has a magnitude less than a low-magnitude threshold, where N is an integer greater than or equal to three,
circuitry configured to generate a pulse insertion vector if said local minimum event detection circuit detects a low-magnitude sample having a magnitude less than said low-magnitude threshold,
a multiplier circuit configured to scale an insertion pulse by said pulse insertion vector to provide a scaled insertion pulse, and
combining circuitry configured to combine said scaled insertion pulse with said rectangular-coordinate baseband signal in the temporal vicinity of said detected low-magnitude sample to form said AMPR-reduced rectangular-coordinate baseband signal,
wherein further the local minimum event detection circuit configures to identify a lowest-magnitude sample from among samples of said N-sample set detected to have magnitudes less than said low-magnitude threshold.

29. A polar transmitter, comprising:
a baseband processor including an average-to-minimum power ratio (AMPR) reduction circuit configured to reduce the AMPR of a rectangular-coordinate baseband signal and provide an AMPR-reduced rectangular-coordinate baseband signal;
a rectangular-to-polar converter configured to convert said AMPR-reduced rectangular-coordinate baseband signal to a polar-coordinate baseband signal having amplitude and angle components;
an amplitude modulator configured to generate an amplitude-modulated power supply signal from the amplitude component of said polar-coordinate baseband signal;

an angle modulator configured to generate an angle-modulated carrier signal from the angle component of said polar-coordinate baseband signal; and a power amplifier having a first input configured to receive said amplitude-modulated power supply signal, a second input configured to receive said angle modulated carrier signal, and an output configured to provide an amplitude- and angle-modulated carrier signal, wherein said baseband processor includes:

a baseband modulator configured to generate a sequence of symbols formatted in accordance with a non-constant envelope modulation scheme, a pulse-shaping filter configured to band-limit said sequence of symbols and provide a sequence of samples representing said rectangular-coordinate baseband signal, and an AMPR reduction circuit coupled between said pulse-shaping filter and an output of said baseband processor, said AMPR reduction circuit including:

a local minimum event detection circuit configured to detect whether a sample in an N-sample set of baseband samples has a magnitude less than a low-magnitude threshold, where N is an integer greater than or equal to three, circuitry configured to generate a pulse insertion vector having an angle that can be set to an angle within a range of angles between the direction of a vector defining said detected low-magnitude sample and the direction of a vector that is orthogonal to a trajectory of said baseband signal in the temporal vicinity of said detected low-magnitude sample, a multiplier circuit configured to scale an insertion pulse by said pulse insertion vector to provide a scaled insertion pulse, and combining circuitry configured to combine said scaled insertion pulse with said rectangular-coordinate baseband signal in the temporal vicinity of said detected low-magnitude sample to form said AMPR-reduced rectangular-coordinate baseband signal, wherein further the local minimum event detection circuit configures to identify a lowest-magnitude sample from among samples of said N-sample set detected to have magnitudes less than said low-magnitude threshold.

* * * * *

UNITED STATES PATENT AND TRADEMARK OFFICE
CERTIFICATE OF CORRECTION

PATENT NO.       : 8,306,486 B2
APPLICATION NO.  : 12/508477
DATED            : November 6, 2012
INVENTOR(S)      : Lee It is certified that error appears in the above-identified patent and that said Letters Patent is hereby corrected as shown below:

Claim 22, Col. 19, line 29: "signal," is missing from the end of the sentence;
Claim 22, Col. 19, line 32: "samples of and N-sample" should read --samples of an N-sample--.

Signed and Sealed this
Nineteenth Day of February, 2013

Teresa Stanek Rea
*Acting Director of the United States Patent and Trademark Office*